US007358848B2

(12) United States Patent
Mohamadi

(10) Patent No.: US 7,358,848 B2
(45) **Date of Patent: *Apr. 15, 2008**

(54) WIRELESS REMOTE SENSOR

(76) Inventor: Farrokh Mohamadi, 8 Halley, Irvine, CA (US) 92612-3797

( * ) Notice: Subject to any disclaimer, the term of this patent is extended or adjusted under 35 U.S.C. 154(b) by 1074 days.

This patent is subject to a terminal disclaimer.

(21) Appl. No.: 10/422,907

(22) Filed: Apr. 25, 2003

(65) Prior Publication Data

US 2004/0095256 A1 May 20, 2004

Related U.S. Application Data

(60) Provisional application No. 60/436,749, filed on Dec. 27, 2002, provisional application No. 60/431,587, filed on Dec. 5, 2002, provisional application No. 60/428,409, filed on Nov. 22, 2002, provisional application No. 60/427,665, filed on Nov. 19, 2002.

(51) Int. Cl.
*H04Q 5/22* (2006.01)

(52) U.S. Cl. ................. 340/10.34; 340/10.1; 340/10.3; 340/572.7; 340/539.1; 340/854.6; 343/729; 343/751; 343/700; 343/853; 343/795; 343/893; 342/372; 342/152

(58) Field of Classification Search ............. 340/10.34, 340/870.18, 539.1, 572.1, 10.1, 10.3; 235/491; 455/25, 15, 506; 342/372, 152, 382, 383; 343/700 MS, 853, 795, 893, 729, 751, 907, 343/700

See application file for complete search history.

(56) References Cited

U.S. PATENT DOCUMENTS

| | | | | |
|---|---|---|---|---|
| 5,523,764 | A * | 6/1996 | Martinez et al. | 342/372 |
| 5,751,249 | A * | 5/1998 | Baltus et al. | 342/372 |
| 6,407,483 | B1 | 6/2002 | Nunuparov et al. | |
| 6,870,503 | B2 * | 3/2005 | Mohamadi | 342/372 |
| 6,963,307 | B2 * | 11/2005 | Mohamadi | 343/700 MS |
| 2001/0001616 | A1 | 5/2001 | Rakib et al. | |
| 2001/0008083 | A1 | 7/2001 | Brown | |
| 2001/0013830 | A1 | 8/2001 | Garber et al. | |
| 2001/0038323 | A1 | 11/2001 | Komazaki et al. | |
| 2001/0045914 | A1 | 11/2001 | Bunker | |
| 2002/0057173 | A1 | 5/2002 | Johnson | |
| 2002/0057183 | A1 | 5/2002 | Oldfield | |
| 2002/0065599 | A1 | 5/2002 | Hameleers et al. | |
| 2002/0091491 | A1 | 7/2002 | Jackson et al. | |
| 2002/0094515 | A1 | 7/2002 | Erlach et al. | |
| 2002/0097696 | A1 | 7/2002 | Kossi et al. | |
| 2002/0097700 | A1 | 7/2002 | Alastalo et al. | |
| 2002/0098913 | A1 | 7/2002 | Goldman | |

(Continued)

OTHER PUBLICATIONS

"Link Technology Aspects In Multihop Ad Hoc Networks" by Sami Uskela, 2002.

(Continued)

*Primary Examiner*—Brian Zimmerman
*Assistant Examiner*—Vernal Brown
(74) *Attorney, Agent, or Firm*—Jonathan W. Hallman; MacPherson Kwok Chen & Heid LLP

(57) ABSTRACT

An integrated circuit implements a wireless remote sensor. The wireless remote sensor includes an antenna coupled to an energy distribution unit to allow passive collection of electrical charge. A signal processing unit couples to the energy distribution unit and modulates transmission by the antenna according to a binary code.

10 Claims, 24 Drawing Sheets

U.S. PATENT DOCUMENTS

| | | | | |
|---|---|---|---|---|
| 2002/0126748 | A1 | 9/2002 | Rafie et al. | |
| 2002/0154620 | A1 | 10/2002 | Azenkot et al. | |
| 2002/0170051 | A1 | 11/2002 | Watanabe et al. | |
| 2002/0171602 | A1 | 11/2002 | Feibig et al. | |
| 2003/0107517 | A1 * | 6/2003 | Ikeda et al. | 342/372 |
| 2004/0112964 | A1 * | 6/2004 | Empedocles et al. | 235/491 |

OTHER PUBLICATIONS

"Cross-Layer Routing And Multiple-Access Protocol For Power-Controlled Wireless Access Nets" by Izhak Rubin et al., UCLA, Los Angeles, CA, no update.

"A Mixed-Signal Sensor Interface Microinstrument" by Keith L. Kraver et al., pp. 14-17, no update.

CSMA/CA With Beam Forming Antennas In Multi-Hop Packet Radio by Marvin Sanchez et al., Royal Institute of Technology, Stockholm, Sweden, no update.

"A New Phase-Shifterless Beam-Scanning Technique Using Arrays Of Coupled Oscillators" by P. Liao, IEEE Transactions of Microwave Theory and Techniques, vol. 41, No. 10, Oct. 1993.

"A New Beam-Scanning Technique by Controlling the Coupling Angle in a Coupled Oscillator Array" by Jae-Ho Hwang et al, IEEE Microwave and Guided Wave Letters, vol. 8, No. 5, May 1998.

"An Analysis of Mode-Locked Arrays of Automatic Level Control Oscillators" by Jonathan J. Lynch et al., IEEE Transactions on Circuits and Systems, vol. 41, No. 12, Dec. 1994.

"Analysis of Oscillators With External Feedback Loop For Improved Locking Range and Noise Reduction" by Heng-Chia Chang, IEEE Transactions of Microwave Theory and Techniques, vol. 47, No. 8, Aug. 1999.

* cited by examiner

WIRELESS REMOTE SENSOR

RELATED APPLICATIONS

This application claims the benefit of U.S. Provisional Application No. 60/427,665, filed Nov. 19, 2002, U.S. Provisional Application No. 60/428,409, filed Nov. 22, 2002, U.S. Provisional Application No. 60/431,587, filed Dec. 5, 2002, and U.S. Provisional Application No. 60/436,749, filed Dec. 27, 2002. The contents of all four of these applications are hereby incorporated by reference in their entirety.

TECHNICAL FIELD

The present invention relates generally to sensors, and more particularly to an integrated wireless remote sensor.

BACKGROUND

Conventional high-frequency antennas are often cumbersome to manufacture. For example, antennas designed for 100 Hz bandwidths typically use machined waveguides as feed structures, requiring expensive micro-machining and hand-tuning. Not only are these structures difficult and expensive to manufacture, but they are also incompatible with integration to standard semiconductor processes.

Because of the expense and difficulties associated with micro-machined structures, semiconductor-based designs that enable the use of conventional photolithographic techniques in lieu of micromachining are needed. Such semiconductor-based antennas may then be integrated with signal processing and control circuitry onto a single or multiple substrates to form an integrated antenna and signal processing circuit (IASPC).

One desirable application for an IASPC would be a wireless remote sensor. The need for overhead intelligence, surveillance, and reconnaissance is growing in both civilian and military applications. A wireless remote sensor implemented within an IASPC would enable affordable detection, identification, and tracking of objects in urban and foliated areas. Accordingly, there is a need in the art for a semiconductor-based remote wireless sensor.

SUMMARY

In accordance with one aspect of the invention, a wireless remote sensor is implemented within an integrated circuit. The wireless remote sensor includes an antenna array coupled to a energy distribution unit, wherein the energy distribution unit is configured to receive electrical energy from the antenna array as generated by an RF signal received at the array and to rectify and store the electrical energy. A signal processing unit couples to the energy distribution unit, wherein the signal processing unit is configured to receive stored electrical energy from the energy distribution unit and to modulate a transmission by the antenna according to a binary code selected according to the RF signal.

The invention will be more fully understood upon consideration of the following detailed description, taken together with the accompanying drawings.

DETAILED DESCRIPTION

Figure 1:
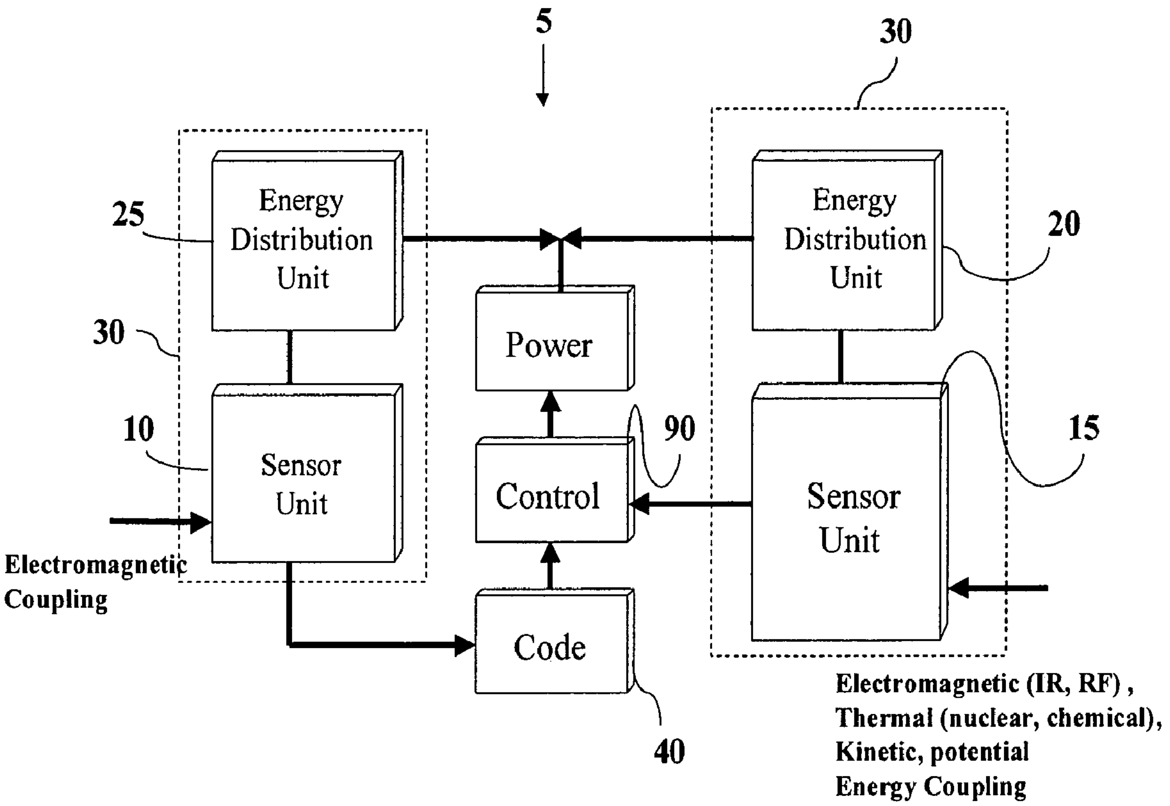
FIG. 1 is a block diagram of a wireless remote sensor according to one embodiment of the invention.

As seen in FIG. 1, a wireless remote sensor 5 includes an antenna or antenna array 10 that converts received RF energy into electrical current that is then coupled to energy distribution unit 20. Alternatively, other sources of energy besides RF energy may be converted to electrical charge by sensor unit 15 coupled to an energy distribution unit 20. For example, sensor unit 15 may sense and convert thermal energy (such as from a nuclear or chemical reaction), kinetic energy, pressure changes, light/photonics, or other suitable energy sources. Together, each sensor unit 10 or 15 and energy distribution unit 20 forms an energy conversion unit 30. To enable active rather than passive operation, wireless remote sensor 5 may also include a battery (not illustrated).

Code unit 40 responds to the stimulation of sensor unit 10 or 15 and provides the proper code to indicate the source of the stimulation. For example, should sensor 15 be a piezo-electric transducer, impact of an object on sensor 15 may generate electrical charge about the size of the impact and its recorded environment. This information may then be transmitted wirelessly by sensor unit 10 to provide a remote sensing capability.

Figure 2:
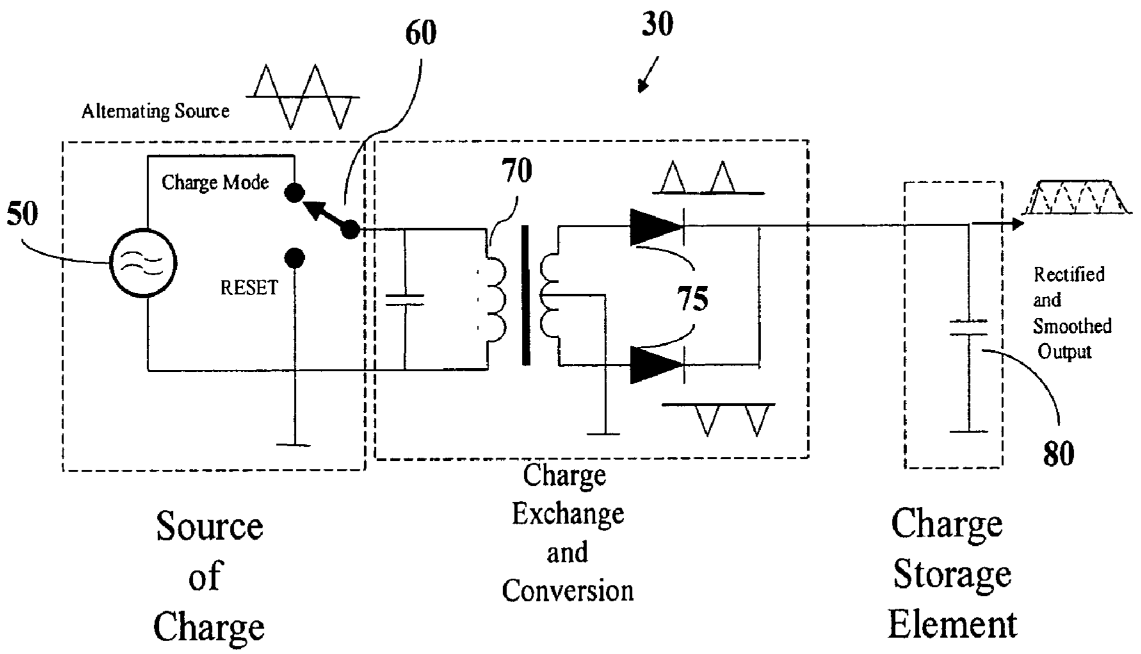
FIG. 2 is a schematic illustration of a passive power collection technique according to one embodiment of the invention.

Referring now to FIG. 2, an energy conversion unit 30 responds to a radio frequency (RF) stimulation represented by AC source 50. Sensor unit 10 (FIG. 1) within energy conversion unit 30 is represented by a transformer 70. During RF stimulation, symbolic switch 60 couples AC current through the primary winding of transformer 70. On the secondary side of transformer 70, diodes 75 rectify the secondary current. The rectified current is then received by a storage capacitor 80. As a result, storage capacitor 80 may then provide a rectified and smoothed current to power the remaining components in wireless remote sensor 5 (FIG. 1).

Sensor unit 10, which can be an antenna array (hereinafter antenna array 10), and sensor unit 15 detect environmental changes and respond with analog signals as is known in the art. Control unit 90 provides an anklog-to-digital (A/D) conversion to convert these analog signals into digitized signals. Control unit 90 responds to these digitized signals by encoding RF transmissions by antenna array 10 according to codes provided by code unit 40. Code unit 40 may be programmed before operation with the desired codes or they may be downloaded through RF reception at antenna array 10 during operation. Depending upon the RF signal received at antenna array 10, the appropriate code from code unit 40 will be selected. For example, an external source may interrogate antenna array 10 with a continuous signal operating in an X, K, or W band. Antenna array 10 converts the received signal into electrical charge that is rectified and distributed by energy distribution unit 25. In response, control unit 90 modulates the transmission by antenna array 10 according to a code selected from code unit 40 (using, for example, a code of 1024 bits or higher), thereby achieving diversity antenna gain. In embodiments having a plurality of codes to select from, the frequency of the received signal may be used to select the appropriate code by which control unit 90 modulates the transmitted signal. Although wireless remote sensor 5 may be configured for passive operation, it will be appreciated that significant increased range capability is provided by using an internal battery (not illustrated).

Antenna Array and Coupling Array Mesh

Figure 3A:
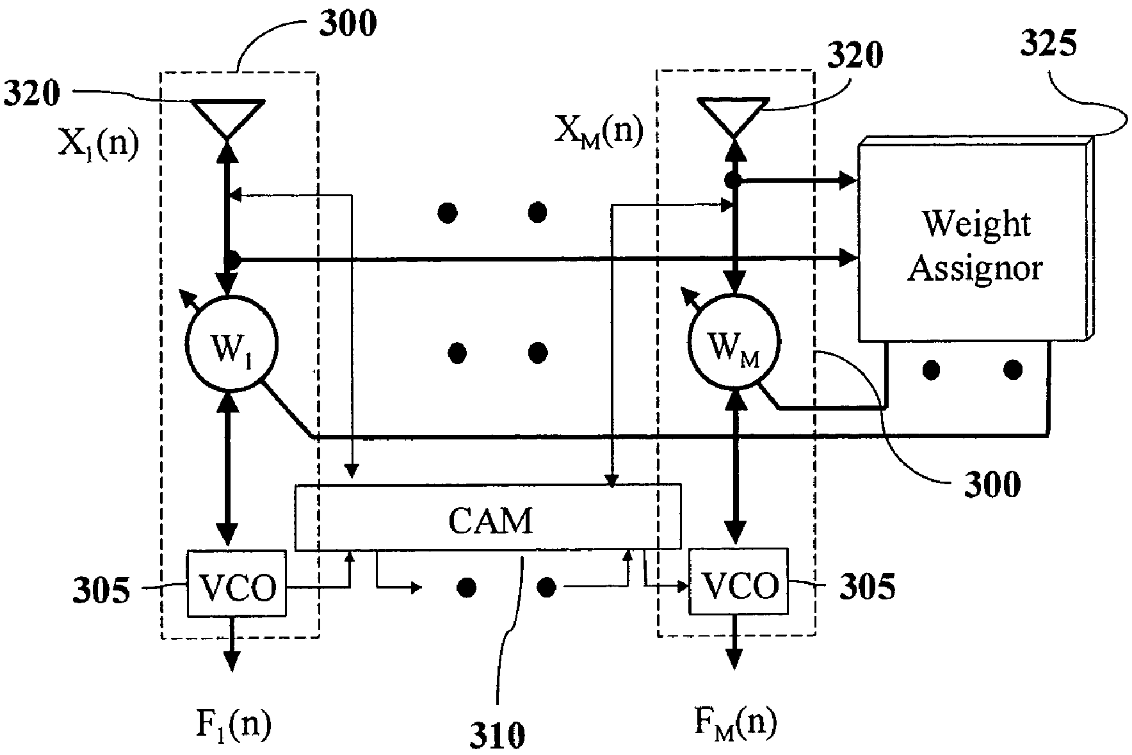
FIG. 3*a* is a conceptual illustration of the relationship between a coupling array mesh and integrated antenna units forming an array according to one embodiment of the invention.

An embodiment of antenna array 10 comprises an array of integrated antenna units 300 is illustrated in FIG. 3*a*. Each integrated antenna unit 300 acts as a self contained transmitter/receiver by having its own voltage controlled oscillator (VCO) 305 coupled to an antenna element 320 functioning as a resonator and load to its VCO 305. Each VCO 305 couples to its antenna element 320 through a coupling array mesh (CAM) 310 which also acts as a local coupler between integrated antenna units 300 and distributes a master clock and the desired phasing (phase offset) with respect to the master clock to integrated antenna units 300 to enable adaptive beam-forming techniques. As is known in the adaptive beam-forming art, the received or transmitted signal from each antenna element 320 is assigned a weight and phase-shift, depending upon the particular beam-forming algorithm being employed. These phase-shifts and/or amplitude changes are effected through coupling array mesh

310. Depending upon the beam-forming algorithm implemented through coupling array mesh 310, each integrated antenna unit 300 is assigned a complex weight (amplitude and phase) as shown symbolically be weight assign or module 325. These complex weights couple through coupling array mesh 310 to integrated antenna units 300.

The antenna array 10 resulting from an arrangement of integrated antenna units 300 may provide a number of basic diversity schemes as is known in the art. For example, spatial diversity may be achieved by ensuring that the separation between integrated antenna units 300 is large enough to provide independent fading. A spatial separation of one-half of the operating frequency wavelength is usually sufficient to ensure non-correlated signals. By configuring individual integrated antenna units 300 to transmit either horizontally or vertically polarized signals, received signals in the resulting orthogonal polarizations will exhibit non-correlated fading statistics. A received signal at an array of integrated antenna units 300 will arrive via several paths, each having a different angle of arrival. By making integrated antenna units 300 directional, each directional antenna may isolate a non-correlated different angular component of the received signal, thereby providing angle diversity. Moreover, a received signal may be spread across several carrier frequencies. Should the carrier frequencies be separated sufficiently to ensure non-correlated fading, integrated antenna units 310 may be configured for operation across these carrier frequencies to provide frequency diversity.

It will be appreciated that integrated antenna units 300 and coupling array mesh 310 may be implemented within any suitable device in addition to being implemented within wireless remote sensor 5 (FIG. 1). Should the device incorporating antenna units 300 be a passive device such as a passive embodiment of wireless remote sensor 5, coupling array mesh 310 may also distribute charge to energy distribution unit 20. To enable synthetic phase shifting in one embodiment of the invention, coupling array mesh 310 distributes to each integrated antenna unit 300 a master or reference clock and a phase offset. Each VCO 305 may be used as component of a phase-locked-loop (discussed with respect to FIG. 9) such that VCO 305 provides an oscillation frequency that is offset in phase from the master clock by the phase offset as is known in the art.

Figure 3B:
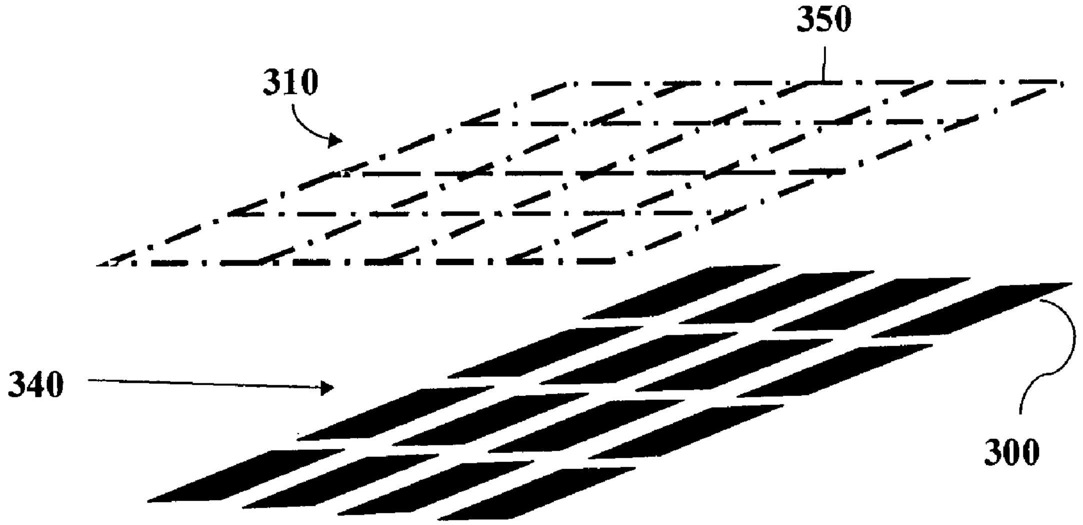
FIG. 3*b* is a conceptual illustration of the relationship between the coupling array mesh of FIG. 3*a* and multiple antenna arrays according to one embodiment of the invention.

Coupling array mesh 310 may resistively couple to integrated antenna units 300 to provide the master clock. Alternatively, coupling array mesh 310 may radiatively couple to integrated antenna units 300 as seen in FIG. 3*b*. In a radiatively-coupled embodiment, antenna elements 300 may form sub-arrays 340 such that each sub-array 340 contains an arbitrary number of antenna elements 300. As will be described further herein, sub-arrays 340 may be formed on the same substrate (not illustrated) or on separate substrates. Also formed on the substrate (or, depending upon the embodiment, substrates), are coupling array mesh antennas (shown conceptually by mesh 350) configured for wide-bandwidth operation. Thus, in a radiatively-coupled embodiment, coupling array mesh 310 comprises array mesh antennas 350. Mesh antennas 350 control the phase offset between integrated antenna units 300 within any given sub-array 340 relative to the remaining sub-arrays 340. In this fashion, the phase offset between sub-arrays 340 may be controlled by mesh antennas 350 such that sub-arrays 340 form a “sea” of phased arrays that collectively perform a beam forming and steering function. Although mesh antennas 350 would generally be designed for operation (transmit and receive) at lower frequency bandwidths as compared to the typically higher frequency bandwidth used for sub-array 340 operation, it may be also designed for the same or higher frequency operation as compared to sub-arrays 340.

Regardless of whether coupling array mesh 310 couples resistively, inductively, or through electromagnetic wave propagation to integrated antenna elements 300, each sub-array 340 will have a different propagation path, enabling the collection of elements to distinguish individual propagation paths within a certain resolution. As a consequence, sub-arrays 340 may encode independent streams of data onto different propagation paths or linear combinations of these paths to increase the data transmission rate. Alternatively, the same data may be transmitted over different propagation paths to increase redundancy and protect against catastrophic signals fades, thereby providing diversity gain. Each sub-array 340 may electronically adapt to its environment by looking for pilot tones or beacons and recovering certain characteristics such as an alphabet or a constant envelope that a received signal is known to have. In addition, sub-arrays 340 may be used to separate the signals from multiple users separated in space but transmitting at the same frequency using a space-division multiple access technique.

Patch Antenna Element

Figure 4A:
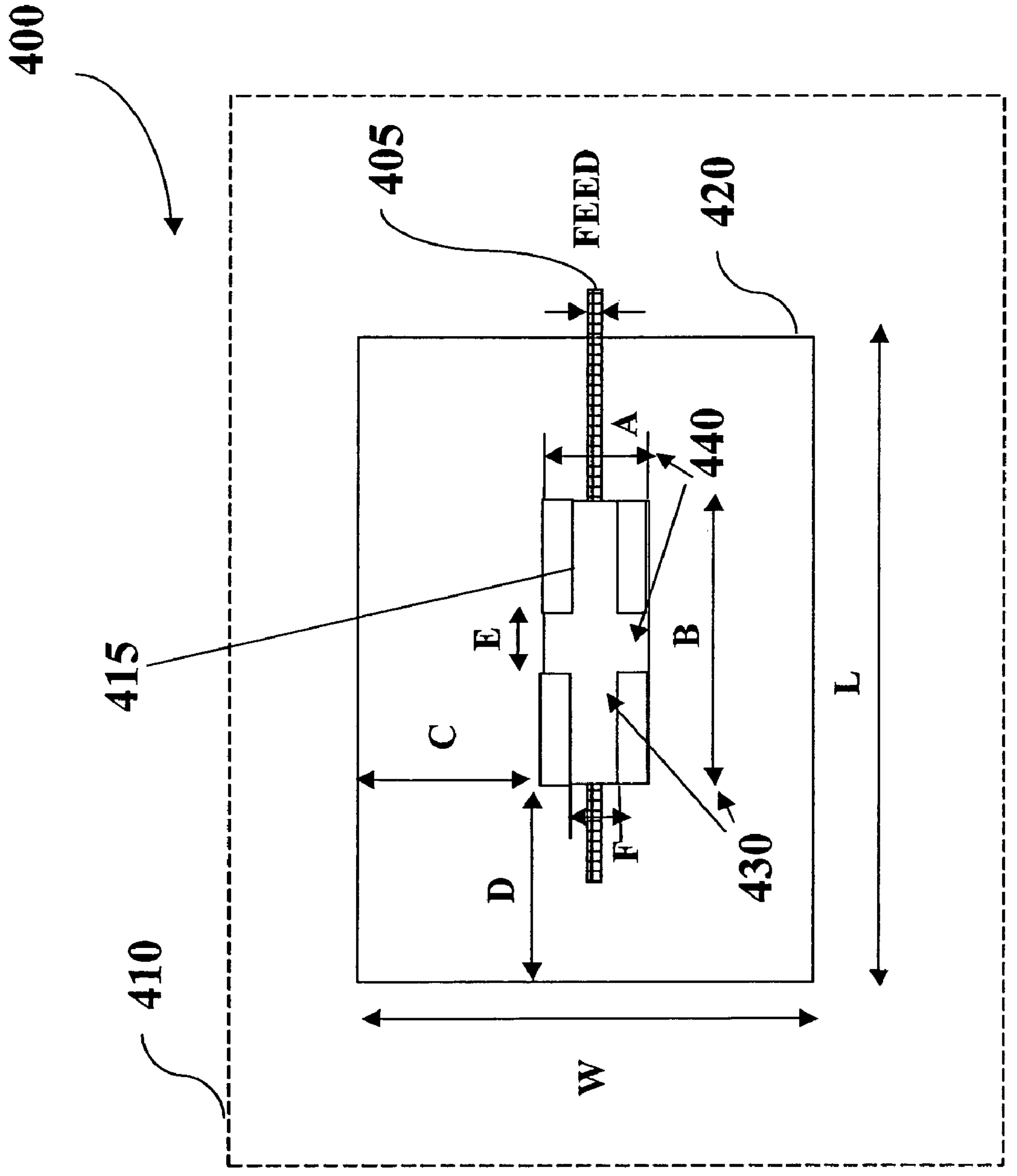
FIG. 4*a* is a plan view, partially cut away, of a patch antenna excited through a cross-shaped aperture according to one embodiment of the invention.
Figure 4B:
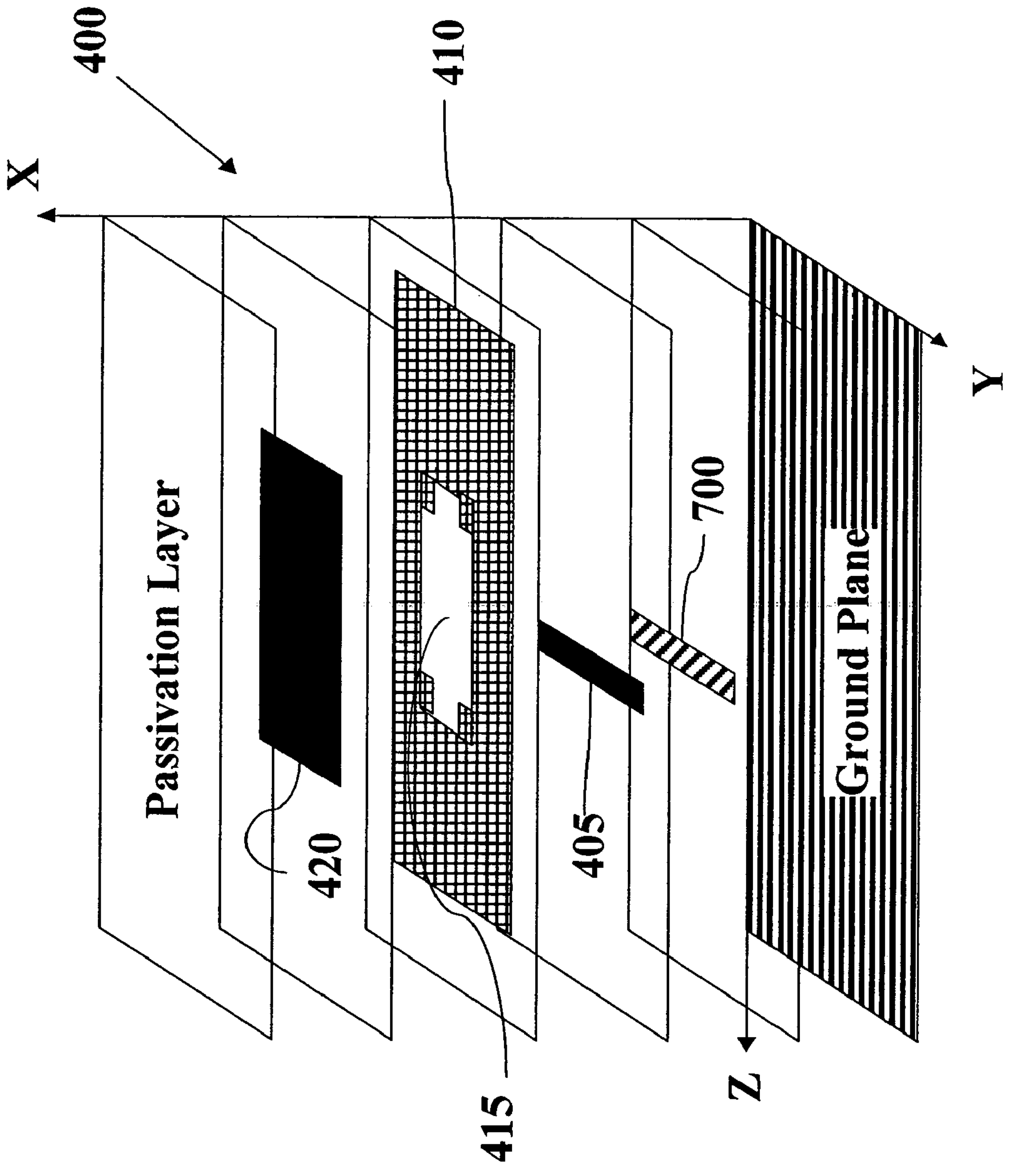
FIG. 4*b* is an exploded side elevational view of the patch antenna of FIG. 4*b* modified to include a narrow shield layer.

Any suitable antenna topology may be used for antenna element 320. For example, as illustrated in FIGS. 4*a* and 4*b*, a patch antenna 400 includes a linear feedline 405 beneath a shield 410. Feedline 405 excites a rectangular patch element 420 through a cross-shaped aperture 415 in shield 410. Shield 410 may be grounded or allowed to float in potential. A longitudinal arm 430 of cross-shaped aperture 415 runs parallel to feedline 405 and is preferably centered over feedline 405. A transverse arm 440 of cross-shaped aperture 415 runs transverse to feedline 405 and centrally across longitudinal arm 430.

Figure 5:
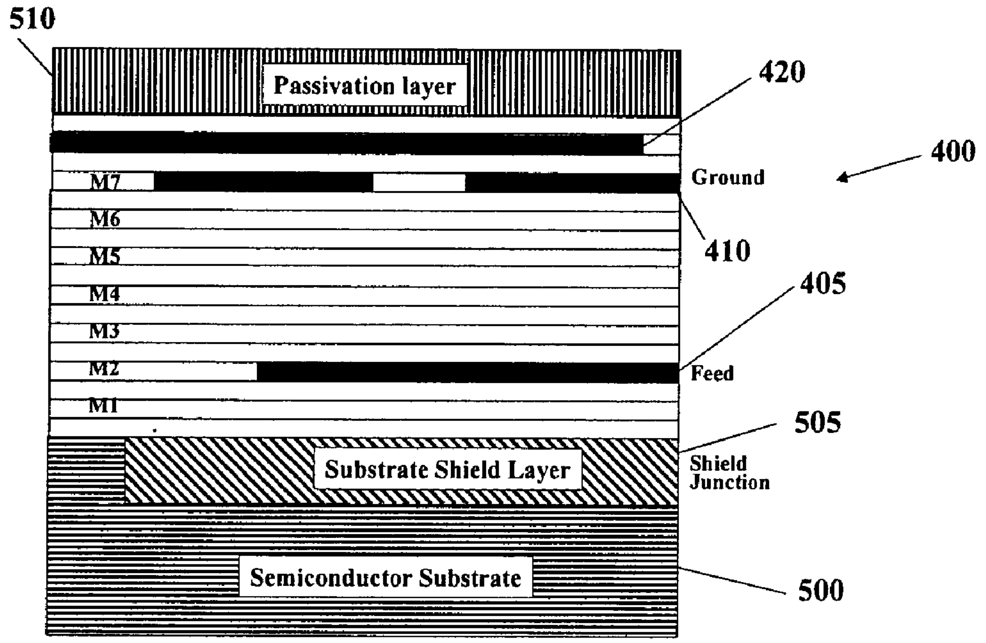
FIG. 5 is a cross sectional view of the patch antenna of FIG. 4*a* implemented using a semiconductor process such as CMOS.
Figure 6A:
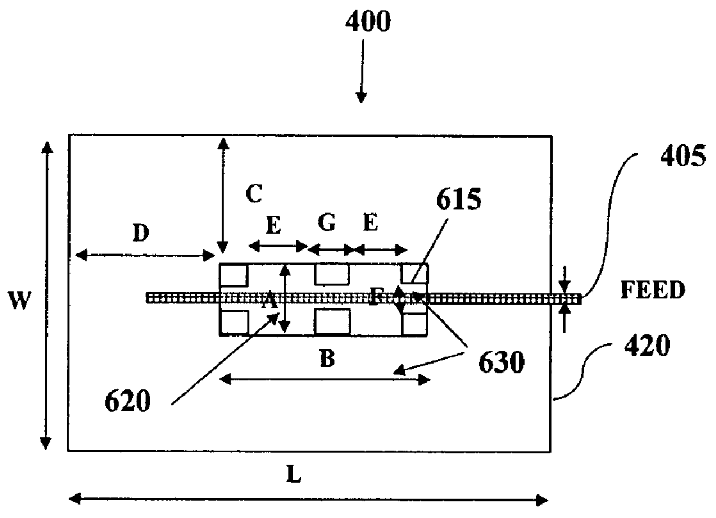
FIG. 6*a* is a plan view, partially cut away, of a patch antenna excited through a cross-shaped aperture having multiple transverse arms according to one embodiment of the invention.

Patch antenna 400 may be advantageously implemented using any conventional semiconductor process such as a CMOS process without the need for micromachining. For example, as illustrated in FIG. 5, patch antenna 400 is implemented using an 8-metal layer CMOS process. Metal layers M1 through M8 are formed using a 0.13 micrometer minimum geometry on a 100 to 120 micrometer substrate 500 which includes a doped substrate shield layer 505. Silicon dioxide layers of 0.7 to 1.0 micrometer thickness separate the metal layer M1 through M8 as is known in the art. Feedline 405 is formed in lower metal layer M2, shield 410 in metal layer M7, and patch element 420 in upper metal layer M8. A silicon nitride or silicon oxide layer 510 or combination of the two isolating materials in a layer thickness of 1 to 10 micrometers may be used to form passivation on upper metal layer M8 to prevent environmental corrosion. Although shown implemented using an 8 metal layer CMOS process, it will be appreciated that patch antenna 400 requires only a three metal layer semiconductor process. As seen in FIG. 4*a*, the dimensions of patch 420, cross-shape aperture 415 in shield 410, and feedline 405 depend upon the desired operating frequency. For example, to achieve a 95 GHz resonant frequency in the 8 metal layer 0.13 micrometer minimum geometry CMOS embodiment of FIG. 5, feedline 405 may have a width of 30 microns, longitudinal arm 430 in aperture 415 may have a length (dimension B) of 380 microns and a width (dimension F) of 160 microns, transverse arm 440 in aperture 415 may have a length (dimension A) of 280 microns and a width (dimension E) of 180 microns, and patch element 420 may be formed as a 500 micron by 500 micron square (dimensions L and W). Patch element 420 (cutaway) may be centered with respect to aperture 615. Simulation results indicate that such dimensions provide a signal return loss of −19 dB at 95 GHz. This impressive performance may be further enhanced using a narrow shield 700 in as seen in FIGS. 4*b* and 7. For example, in an 8 metal layer CMOS embodiment, feedline 405 may be formed in metal layer M2 above narrow shield 700 which is formed in lower metal layer M1. Shield 410 and patch antenna element 420 may be formed in metal layers M7 and M8 as discussed with respect to FIG. 5. Feedline 405 runs parallel to narrow shield 700 and is preferably centered over narrow shield 700. Narrow shield 700 may be grounded or allowed to float in potential. In one embodiment, should narrow shield 700 have the same 30 micron width as feedline 405 as discussed with respect to FIG. 6 and all the remaining dimensions of patch antenna 400 remain the same, simulation results indicate an approximately −30 dB signal return loss and an efficiency of nearly 20%. Thus, patch antenna 400 is robustly designed to be immune to de-tuning as a result of environmental changes such as rain, fog, dirt, and undesired antenna coupling. Narrow shield 700 functions to suppress various elements of transverse electric (TE) and transverse magnetic (TM) that are generated due to substrate surface currents within shield region 505.

Numerous modifications may be made to patch antenna 400. For example, as illustrated in FIG. 6*a*, patch antenna 400 may be modified to provide a skewed wider beam for rapid convergence in beam tracking applications by implementing a cross-shaped aperture 615 that includes two transverse arms 620 rather than the single tranverse arm 440 discussed with respect to FIG. 4*a*. A longitudinal arm 630 of cross-shaped aperture 615 runs parallel to feedline 405 and is preferably centered over feedline 405. The dimensions of longitudinal arm 630 and transverse arms 620 depend upon the desired operating frequency. For example, to achieve a 95 GHz resonant frequency in an 8-metal-layer 0.13 micrometer CMOS embodiment, feedline 405 may be 30 microns in width, longitudinal arm 630 in aperture 615 may have a length (dimension B) of 380 microns and a width (dimension F) of 160 microns, each transverse arm 620 in aperture 615 may have a length (dimension A) of 280 microns and a width (dimension E) of 130 microns, and patch element 420 may be formed as a 500 micron by 500 micron square (dimensions L and W). Transverse arms 620 may be separated by 60 microns and centrally located with respect to longitudinal arm 630. It will be appreciated that many other modifications may be implemented with respect to the cross-shaped aperture 415 discussed with respect to FIG. 4*a*. For example, a plurality of greater than 2 transverse arms may be used. In addition, the location and relative width of any given transverse arm with respect to the longitudinal arm may be varied.

Figure 6B:
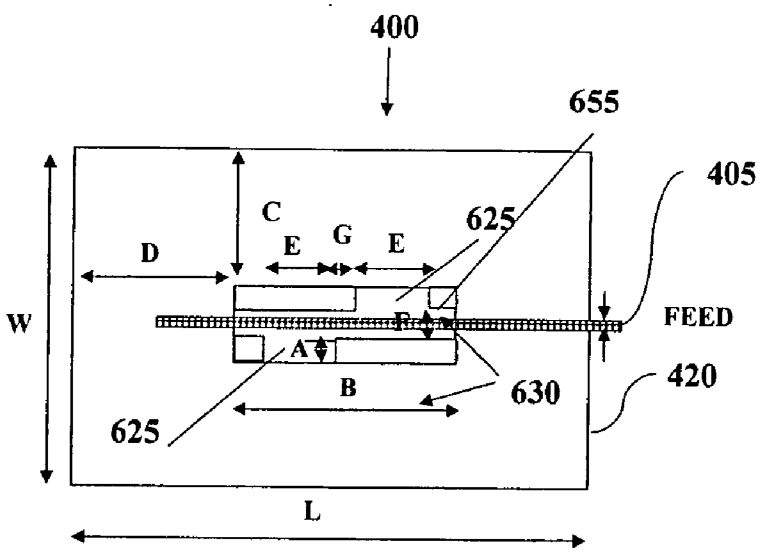
FIG. 6*b* is a plan view, partially cut away, of a patch antenna excited through an aperture having a longitudinal arm and two transverse half-arms according to one embodiment of the invention.
Figure 7:
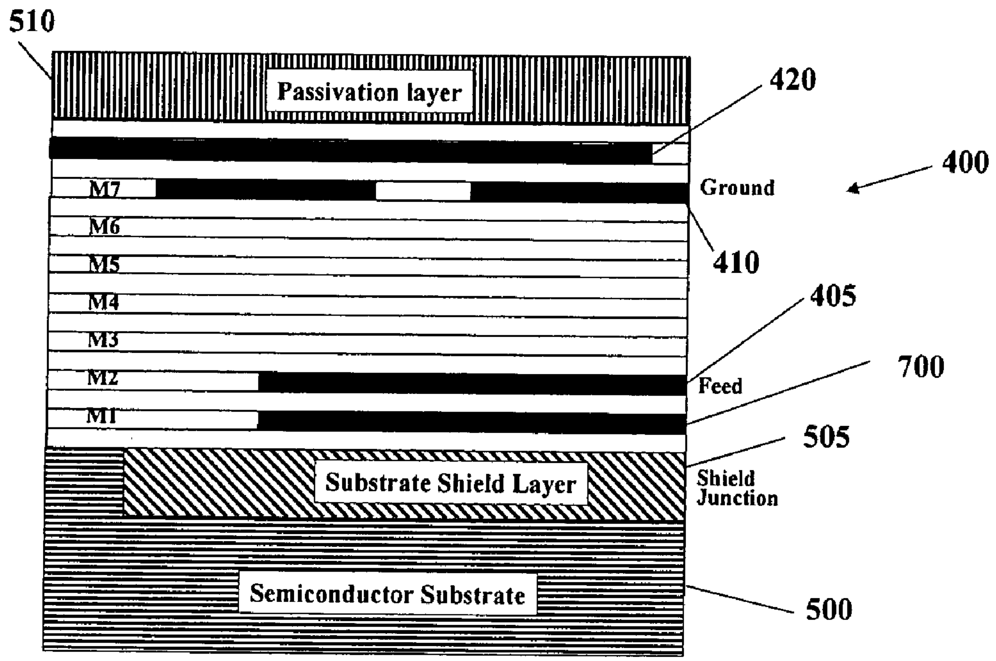
FIG. 7 is a cross sectional view of the patch antenna of FIG. 4*b* implemented using a semiconductor process such as CMOS.

As an alternative to a cross-shaped aperture, longitudinal arm 630 in an aperture 655 may have at least two transverse half-arms 625 that are longitudinally staggered and branch from opposing sides of longitudinal arm 630 as seen in FIG. 6*b*. Should aperture 655 be dimensioned for 95 GHz resonant operation, longitudinal arm 630 may have a length (dimension B) of 380 microns and a width (dimension F) of 160 microns as discussed with respect to FIG. 6*a*. Each transverse half-arm 625 has a width (dimension E) of 130 microns and a length (dimension A) of 60 microns and are separated from each other by a gap (dimension G) of 60 microns. Patch element 420 may be formed as a 500 micron by 500 micron square (dimensions L and W), centered with respect to aperture 655.

Figure 6C:
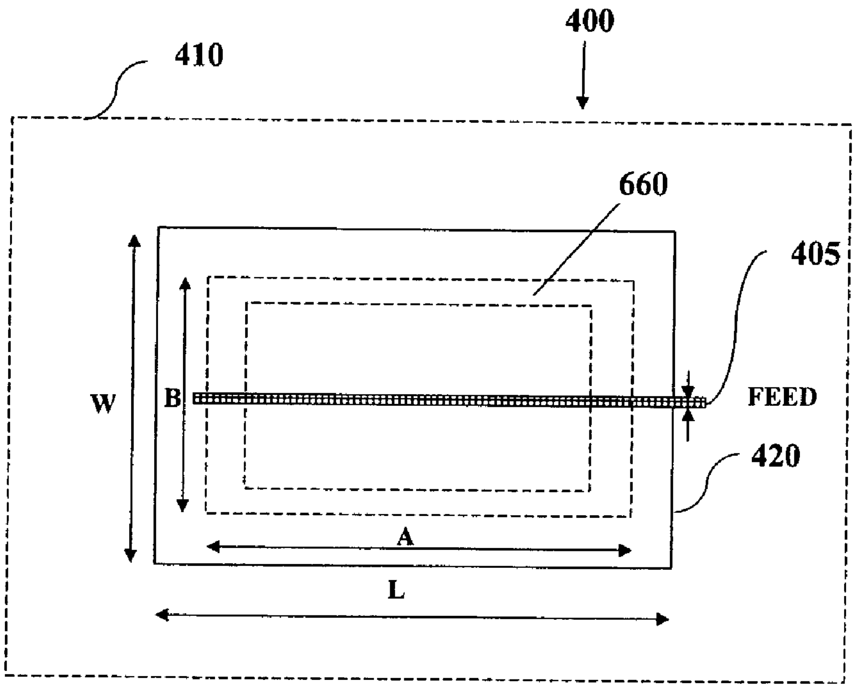
FIG. 6*c* is a plan view, partially cut away, of a patch antenna excited through an annular aperture according to one embodiment of the invention.

As another alternative to a cross-shaped aperture, a patch antenna 400 may be formed using a rectangular annular aperture 660 in shield layer 410 as illustrated in FIG. 6*c*. The dimensions of rectangular annular aperture 660 depend upon the desired resonant frequency. For a resonant frequency of 95 GHz in an 8-metal-layer 0.13 micrometer CMOS embodiment, rectangular annular aperture 660 may have a longitudinal length of 380 microns (dimension A) and a transverse length of 280 microns (dimension B). Thus, the overall length and width of aperture 660 adapted for 95 GHz resonant frequency operation is the same as the cross-shaped aperture embodiments. Similarly, the length and width of patch antenna element 420 is also the same. The width of aperture 660 may be approximately 30 microns. Feedline 405 is centered with respect to the longitudinal orientation of aperture 660.

T-shaped Antenna Element

Figure 8A:
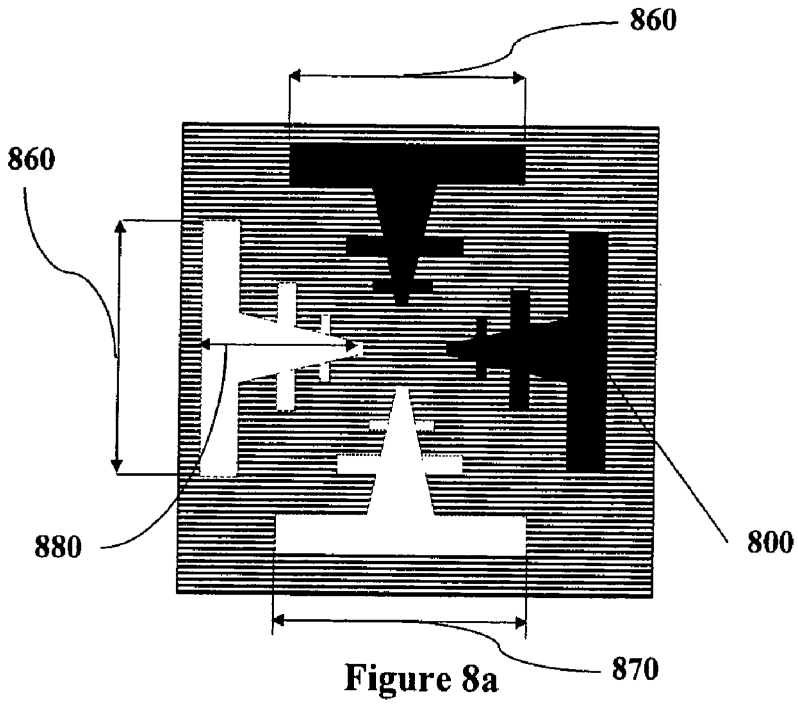
FIG. 8*a* is a plan view of T-shaped antenna elements according to one embodiment of the invention.
Figure 8B:
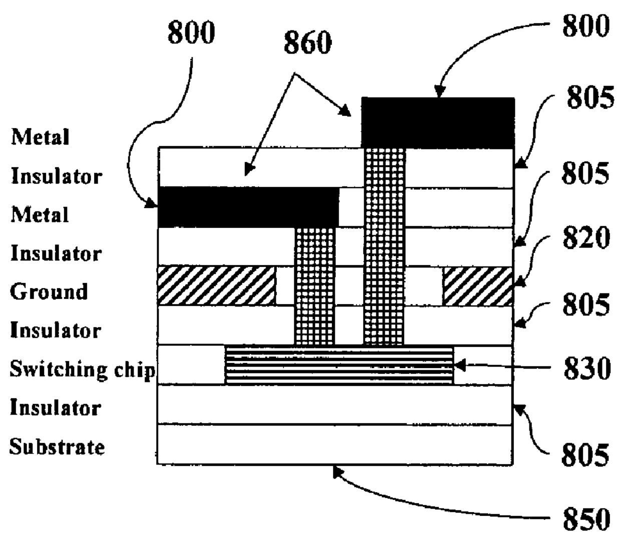
FIG. 8*b* is a cross sectional view of a pair of T-shaped antenna elements from FIG. 8*a* implemented using a semiconductor process such as CMOS.

Other embodiments for antenna element 320 may be used within each integrated antenna element 300. For example, as illustrated in FIG. 8*a*, a T-shaped antenna element 800 may be used to form antenna element 320. As seen in cross section in FIG. 8*b*, each T-shaped antenna element 800 may be formed using a metal layer of a standard semiconductor process such as CMOS. T-shaped antenna elements 800 are excited using vias that extend through insulating layers 805 and through a ground plane 820 to driving transistors formed on a switching layer 830 separated from a substrate 850 by an insulating layer 805. Two T-shaped antenna elements 800 may be excited by switching layer 830 to form a dipole pair 860. To provide polarization diversity, two dipole pairs 860 may be arranged such that the transverse arms 870 in a given dipole pair 860 are orthogonally arranged with respect to the transverse arms 870 in the remaining dipole pair 860.

Depending upon the desired operating frequencies, each T-shaped antenna element 800 may have multiple transverse arms 870. The length of each transverse arm 870 is approximately one-fourth of the wavelength for the desired operating frequency. For example, a 2.5 GHz signal has a quarter wavelength of approximately 30 mm, a 10 GHz signal has a quarter wavelength of approximately 6.75 mm, and a 40 GHz signal has a free-space quarter wavelength of 1.675 mm. Thus, a T-shaped antenna element 800 configured for operation at these frequencies would have three transverse arms 870 having fractions of lengths of approximately 30 mm, 6.75 mm and 1.675 mm, respectively. The longitudinal arm 880 of each T-shaped element may be varied in length from 0.01 to 0.99 of the operating frequency wavelength depending upon the desired performance of the resulting antenna. For example, for an operating frequency of 105 GHz, longitudinal arm 880 may be 500 micrometer in length and transverse arm 870 may be 900 micrometer in length using a standard semiconductor process. In addition, the length of each longitudinal arm 880 within a dipole pair 860 may be varied with respect to each other. The width of longitudinal arm may be tapered across its length to lower the input impedance. For example, it may range from 10 micrometers in width at the via end to hundreds of micrometers at the opposite end. The resulting input impedance reduction may range from 800 ohms to less than 50 ohms.

Each metal layer forming T-shaped antenna element 800 may be copper, aluminum, gold, or other suitable metal. To suppress surface waves and block the radiation vertically, insulating layer 805 between the T-shaped antenna elements 800 within a dipole pair 860 may have a relatively low dielectric constant such as $\epsilon$=3.9 for silicon dioxide. The dielectric constant of the insulating material forming the remainder of the layer holding the lower T-shaped antenna element 800 may be relatively high such as $\epsilon$=7.1 for silicon nitride, $\epsilon$=11.5 for $Ta_2O_3$, or $\epsilon$=11.7 for silicon. Similarly, the dielectric constant for the insulating layer 805 above ground plane 820 may also be relatively high (such as $\epsilon$=3.9 for silicon dioxide, $\epsilon$=11.7 for silicon, $\epsilon$=11.5 for $Ta_2O_3$).

In an array of T-shaped antenna elements 800, the coupling between elements of radiated waves should be managed for efficient reception. Proper grounding and selection of a very highly conductive substrate beneath silicon substrate 500 (FIG. 7) can depress this coupling. However, T-shaped antenna element 800 may still strongly couple to coupling array mesh 310, enabling the use of phase injection as described below.

Phase Injection

Figure 9:
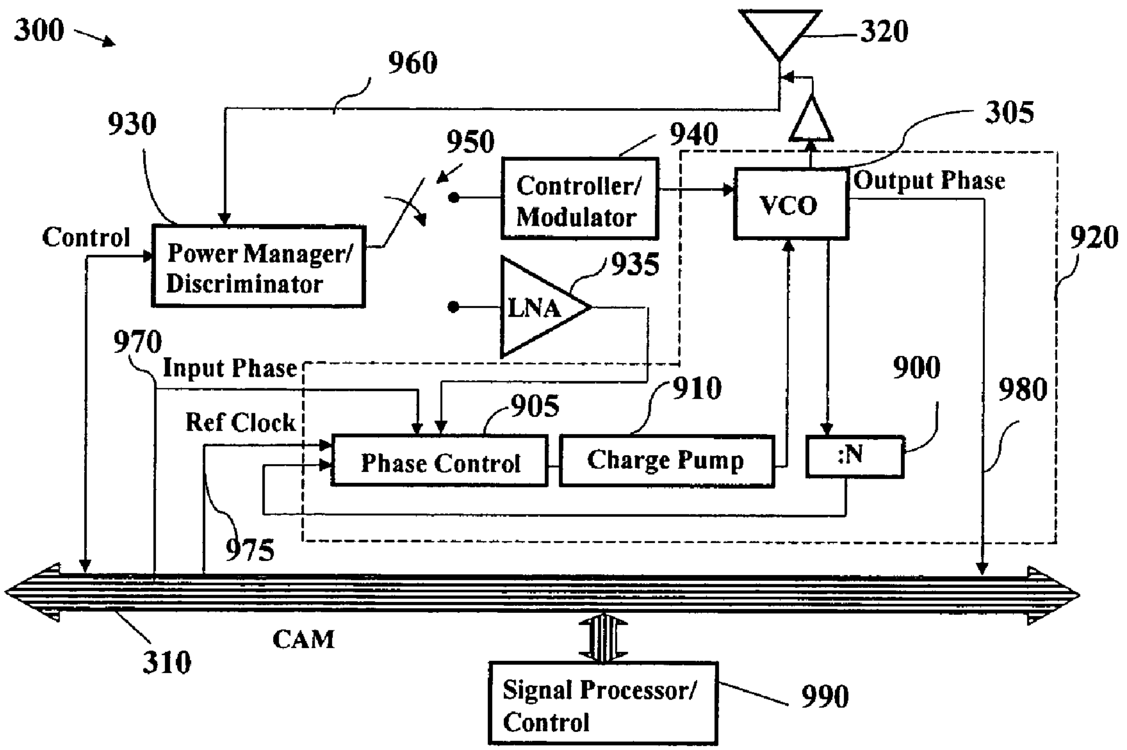
FIG. 9 is a block diagram showing the relationship between an integrated antenna element, a coupling array mesh, and a central signal processing and control module according to one embodiment of the invention.

Regardless of the topology for antenna element 320, coupling array mesh 310 (FIG. 3*a*) distributes signals to integrated antenna units 300 to enable synthetic phase shifting. For example, coupling array mesh 310 may distribute a reference clock and a phase offset to provide phase injection for an integrated antenna unit 300. As illustrated in FIG. 9, VCO 305 may couple with a frequency divider 900, a phase control module 905, and a charge pump 910 to form a phase-locked loop (PLL) 920 as is known in the art. In this embodiment, each integrated antenna element 300 includes a power management module 930. Alternatively, power management could be centralized and controlled through coupling array mesh 310.

Antenna element 320 couples a received signal 960 to power management module 930. Power management module 930 may be configured to compare the power of the received signal 960 to a threshold using, for example, a bandgap reference. Should the received signal power be less than the threshold, power management module 930 prevents a switch 950 from coupling the received signal into a low noise amplifier 935. In this fashion, integrated antenna unit 300 does not waste power processing weak signals and noise. During transmission by antenna element 320, power management unit 930 activates, through switch 950, controller/modulator 940 which modulates the oscillation frequency of VCO 305 according to whatever code a user desires to implement.

Regardless of whether integrated antenna element 300 is transmitting or receiving, coupling array mesh 310 may provide an input phase offset 970 to phase control module 905 and receive an output phase offset 980 from VCO 305. During transmission, coupling array mesh 310 may also provide a reference clock 975 to phase control module 905. Consider the advantages provided by linking integrated antenna unit 300 with coupling array mesh 310 in this fashion. During high frequency transmission and reception, a digital control of PLL 920 could become burdensome. Far example, at the higher data rates enabled by high frequency operation, multipath fading and cross-interference becomes a serious issue. Adaptive beani forming techniques are known to combat these problems. But adaptive beam fanning for transmission specifically at 10 GHz or higher frequencies requires massively parallel utilization of A/D and D/A converters, However, coupling army mesh 310 may couple input phase offset 970, reference clock 975, and output phase offset 980 as analog signals, thereby obviating the need for such massively parallel DSP operations. Moreover, simple and powerful analog beam steering algorithms are enabled using either mode locking or managed phase injection.

Adaptive beam forming gives the ability to adjust the radiation pattern of an antenna array 10 (FIG. 1) according to changes in the signal environment by adjusting the gain and phase of the received or transmitted signal from each integrated antenna unit 300 (FIG. 3*a*). During reception, adaptive beam forming maximizes the antenna array sensitivity in the direction of external source and minimizes the interfering sources. Correlated multi-path components of the desired signal may be either constructively added or suppressed as necessary. It will be appreciated by those of ordinary skill in the art that the present invention is compatible with any adaptive beam forming technique. For example, least mean square, direct matrix inversion, recursive least square, or constant modulus algorithms may be used as the adaptive beam-forming techniques in the present invention. In addition, a retro-directive beam-forming technique may be used. In a retro-directive array, the received signals are conjugated in phase with respect to some reference and re-transmitted.

Although high-frequency operation (such as at 10 GHz or higher) enables greater data transmission rates, effects such as multipath fading and cross-interference becomes more and more problematic. The present invention provides mode locking and managed phase injection techniques to enable any conventional adaptive beam-forming technique, even at higher frequencies.

Digital Phase Injection

Although a digital phase injection approach is hampered by the aforementioned massively parallel utilization of A/D and D/A converters at higher frequencies, coupling array mesh 310 may be used to perform a digital phase injection at lower frequencies. In such an embodiment, the input phase offset 970 represents a binary value as an up-down counter value (digital binary) to address the phase lag or phase advance of VCO 305 with respect to a reference point (such as reference clock 975 ). Coupling array mesh 310 may thus use this digital phase injection process to address each VCO 305 individually. Alternatively, a sub-array 340 (FIG. 3*b*) may be addressed as a unit with the same digital phase offset from coupling array mesh 310. For example, integrated antenna units 300 may be arranged in rows and columns such that each sub-array 340 represents an individual row or column. Coupling array mesh 310 may then be configured to address digital phase injection values by row or by column. These values may be predetermined or may be adaptively changed by digital signal processing and control module 990 (FIG. 9). Digital phase injection requires some settling time within each injected phase-locked loop 920 to adjust for the desired phase depending on the phase-locked loop settling time.

Mode-locked Phase Injection

Figure 10:
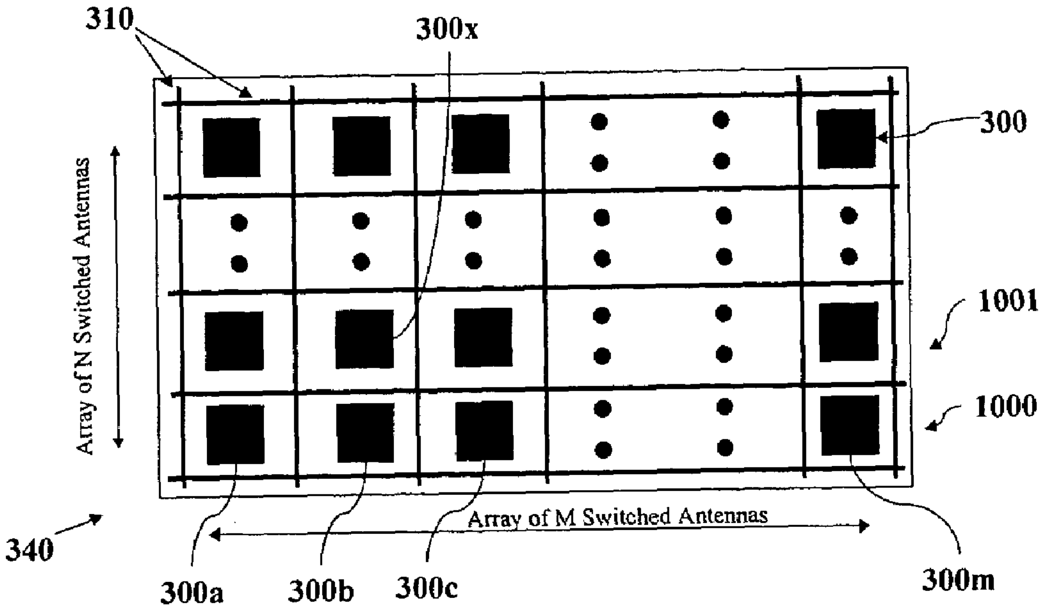
FIG. 10 is a plan view of an antenna array and its functional relationship to a coupling array mesh according to one embodiment of the invention.

As seen in FIG. 10, integrated antenna units 300 may be arranged in rows and columns to form an antenna array 340. With respect to such an arrangement, coupling array mesh 310 may be configured to mutually couple integrated antenna units 300 in a daisy chain unilateral or two-dimensional fashion. This unilateral or two-dimensional daisy chaining may be arranged with respect to either rows or columns. For example, the output phase offset (not illustrated) from a first integrated antenna unit 300*a* in row 1000 may couple through coupling array mesh 310 as the input phase offset (not illustrated) to a second integrated antenna unit 300*b* in row 1000. In turn, the output phase offset from the second integrated antenna unit 300*b* in row 1000 may couple through coupling array mesh 310 as the input phase offset to a third integrated antenna unit 300*c* in row 1000, and so on. Finally, the output phase offset from the mth integrated antenna unit 300*m* may couple as the input phase offset to the mth integrated antenna unit in adjacent row 1001 at which point the phases daisy chain through row 1001 in the opposite direction.

This daisy chaining of phase offset enables a mode locked phase injection mode as follows. Power management modules 930 may be configured such that during reception, only one integrated antenna unit will be declared as a "master" unit. For example, as discussed before with respect to FIG. 9, a given power management module 930 may compare the received power from its antenna element 320 to a threshold power. Should the threshold be exceeded, power management 930 signals a central digital signal processing and control module 990 (FIG. 9) through coupling array mesh 310 that it is the "master." In response, central digital signal processing and control module digitizes the associated output phase offset from the master unit and determines an appropriate input phase offset which should be injected into the master unit according to adaptive beam forming algorithms as is known in the art. The appropriate phase offset may be converted to analog form within central digital signal processing and control module 990 and coupled through coupling array mesh 310 to the integrated antenna unit 300 that has been designated as the master. In turn, the output phase offset from the injected master integrated antenna unit 300 couples through coupling array mesh 310 to adjoining integrated antenna units in the two-dimensional fashion just described. As is known in the art, the resulting mode-locked integrated antenna units 300 will oscillate in a number of equally-spaced spectral modes, with comparable amplitude and locked phases. If positive integer number N of integrated antenna units 300 are mode locked in this fashion, the peak power obtainable from these units is $N^2$ the average power output from each of these units. Should these N integrated antenna units 300 be spatially separated by distances of approximately the operating frequency wavelength, the pulsing transmission from these N units will scan according to the relationship:

$$E(r,\theta,t)=E_0\cdot G(\theta)\cdot\frac{\sin[N(\Delta\omega t+\Delta\varphi+k_0\Delta d\sin\theta)/2]}{\sin[(\Delta\omega t+\Delta\varphi+k_0\Delta d\sin\theta)/2]}\cdot\exp(j\omega_0 t)$$

where $k_0$ is the free space propagation constant, $\Delta_d$ is the antenna spacing, θ is the receiver angle from the center antenna element 310 in the array, G(θ) is the antenna gain pattern for each of the antenna elements 310, $\omega_0$ is the center frequency, and Δω is the fixed pulse repetition modulation frequency. Thus, should each integrated antenna unit 300 be configured for 10 GHz operation and be mode-locked with a 50 MHz separation between each unit, the resulting array will produce a scanning beacon having a beat rate of 50 MHz. If the frequency is kept constant then the phase change will provide a scanner at that frequency.

If the mode spacing (frequency separation) between each integrated antenna unit 300 is less than the locking bandwidth of the associated phase-locked loops 920, each VCO 305 will tend to lock to a single frequency. However, if the mode spacing exceeds this locking bandwidth, the resulting frequency pulling between the coupled VCOs 305 generates a comb spectrum, which also enables mode-locking of the array. By selecting an appropriate set of frequencies, coupled VCOs 305 will settle into a mode-lock state. Such a system of coupled VCOs 305 uses coherent power combining to exhibit stable periodicity. The frequency management condition then exists between all of the VCOs 305. If any VCO 305 in the array is slightly detuned, the equal frequency spacing is maintained; however, the relative phase shifts between VCOs 305 varies. In an array, if the first and last oscillator tunings are fixed, the spectral location and beat frequency are also fixed, and tuning the central element changes only the phases.

The output waveform from an array of mode-locked integrated antenna units 300 depends on the value of the coupling phase angle. For no phase injection, the output envelope bears little resemblance to the desired pulse train, due to the destructive behavior of the phases from the coupled VCOs 305. By varying the injected input phase offset, a nearly ideal multi-mode behavior (depending on the number of array elements) can be generated. It will be appreciated that the mutual pulling effects between VCOs 305 should be kept as low as possible. These mutual pulling effects may be minimized by either increasing the frequency separation between VCOs 305, increasing the VCO 305 Q-factor, or decreasing the coupling strength. The number of mode-locked VCOs 305 should not be too large because the stable mode locking region becomes highly eccentric as the number of elements increases, thus making array tuning difficult and causing high sensitivity to particular VCO 305 tuning errors. Such instability limits the achievable output power, which may otherwise be increased by a factor of $N^2$ as the integer number N or mode-locked VCOs 305 is increased.

Should the beam forming algorithm implemented by central digital signal processing and control module 990 be retro-directive, a simple and elegant retro-directive beam forming system is implemented. In such a case, the master integrated antenna unit 300 is controlled by central digital signal processing and control module 990 to direct its antenna beam at the interrogating transmitter. Because of the mode-locking provided by coupling array mesh 310, the adjacent mode-locked integrated antenna elements will also direct their antenna beams at the interrogating transmitter to provide the $N^2$ enhancement in signal power. By separating an integer number N of antenna elements 320 by approximately one-half the operating frequency, the directivity is around the broadside about N and is higher at sharper angles further from broadside. Thus, the reinforcement of a communication link is a factor of more than $N^2$ at any incoming angle compared to a transponder using just one of the N antenna elements 320. Since an external source always "sees" the peak of the radiation pattern, the array of N antenna elements 320 should not give any null in the mono-static radar cross-sectional pattern. This is one of the fundamental advantages of retro-directive arrays. Since the mono-static radar cross section strongly depends on the element pattern, the antenna topology is important. For maximum coverage, the antenna elements 320 in the array should have as low directivity as possible to reduce the angular dependency of the mono-static radar cross section and the beam-pointing error. An array radiation pattern is given by the product of the element and array factor directivities. The product of the two directivities has a peak off the peak of the array factor when a non-isotropic antenna element 320 is used. Should antenna elements 320 be omni-directional, increasing the number of antenna element 320 or enlarging the array aperture size can reduce this error. Patch antenna element 400 will typically have a broad beam and is good for beam-steering arrays.

Although mode-locking is simple and powerful, even more powerful adaptive beam forming techniques may be implemented using managed phase injection as follows.

Managed Phase Injection

Figure 11:
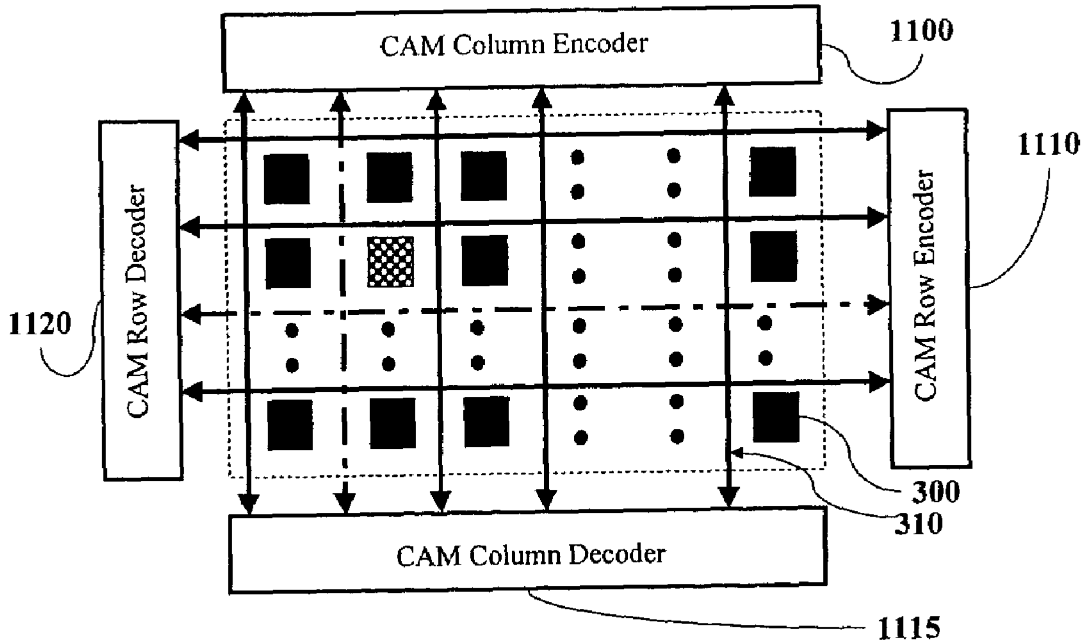
FIG. 11 is a plan view of an antenna array and a coupling array mesh comprising a row and column decoders and encoders according to one embodiment of the invention.

In a managed phase injection embodiment, each integrated antenna unit 300 will have its input phase offset specified by central digital signal processing and control module 990. This managed phase injection may be implemented in a similar fashion to as addressing is performed in digital memories. For example, as seen in FIG. 11, integrated antenna elements 300 may be arranged in rows and columns. Coupling array mesh 310 may include a column encoder 1100 and a row encoder 1110 which receive the output phase offsets from integrated antenna units 300. Because of power management modules 930 (FIG. 9) within each integrated antenna unit 300, column encoder 1100 and row encoder 1110 will receive only the output phase offsets from those integrated antenna units receiving an adequate signal. Column encoder 1100 and row encoder 1110 encode the various output phase offsets to identify which row and column correspond to a given output phase offset. Based on these output phase offsets, central digital signal processing and control module 990 (FIG. 9) provides the proper input phase offsets to implement adaptive beam forming, which are encoded with the address (row and column) for the proper integrated antenna units 300. Column decoder 1115 and row decoder 1120 receive the input phase offsets and decode them so that the intended integrated antenna units 300 may receive their injected input phase offset.

Regardless of whether mode-locked phase injection or managed phase injection is implemented through coupling array mesh 310, analog signals may be used to enable adaptive beam forming techniques at high frequencies that would be problematic to implement using digital signal processing techniques. It will be appreciated, however, that coupling array mesh 310 may be used to provide phase injection using digital signals as A/D and D/A processing speed increases are achieved. Not only does analog phase injection avoid burdensome digital signal processing bottlenecks, it enables the use of inductive coupling as described below.

Inductive Coupling

Figure 12:
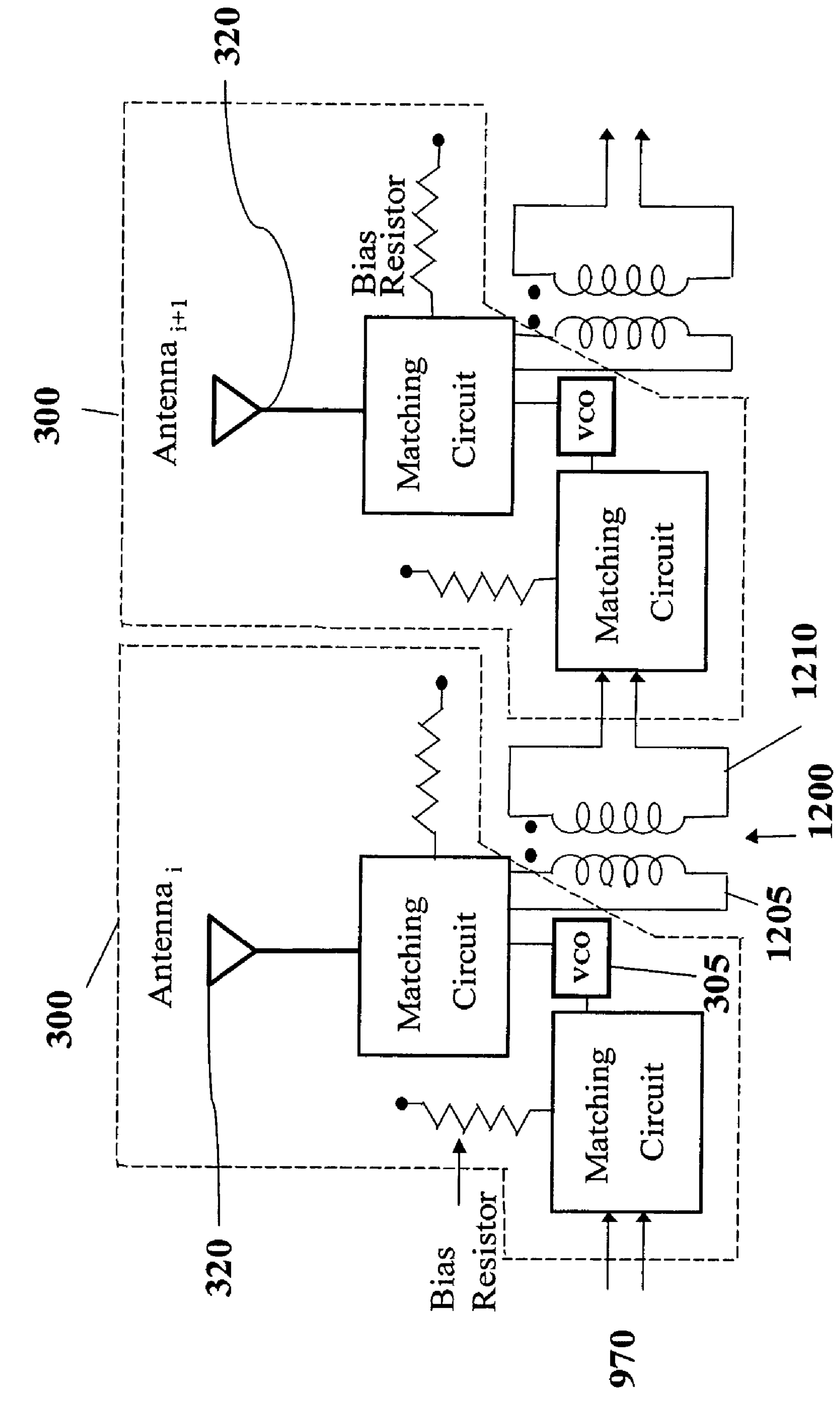
FIG. 12 is a schematic representation of integrated antenna elements with a coupling array mesh providing mutual inductance coupling between the integrated antenna elements according to one embodiment of the invention.

The present invention provides a semiconductor-based beam-forming antenna array. To provide more accurate phase control and improved signal return loss, each antenna element 320 (FIG. 3*a*) may be inductively coupled to its VCO 305 through coupling array mesh 310. In addition, inductive coupling may be used to implement a unilateral or two-dimensional mode-locked phase injection such that CAM 310 comprises transformers 1200 as seen in FIG. 12, Each integrated antenna unit 300 includes a VCO 305 and an antenna element 320 as discussed with respect to FIG. 9. Matching circuits match each VCO 305 to its antenna element 320. In addition the matching circuits match each VCO 305 to its input phase offset signal 970. Should an integrated antenna unit be designated the master, coupling array mesh 310 provides input phase offset 970. A separate transformer (not illustrated) may be used to provide this phase injection or transformers 1200 may have additional windings to accommodate this injection. In turn, the master integrated antenna unit 300 provides an output phase offset 980 (FIG. 9) to a primary winding 1205 of its associated transformer 1200. Depending upon the turn ratio in transformer 1200, the voltage in primary winding 1205 may induce an increased voltage across secondary winding 1210. The voltage across secondary winding 1210 provides the input phase offset 970 for the unilaterally-coupled adjacent integrated antenna unit 300, and so on. Note that bi-lateral or even more complex mode-locking phase injection schemes may be implemented. For example, as seen in FIG. 10, coupling array mesh 310 may be configured such that the output phase offset from a given integrated antenna unit 300 may be coupled to not only the adjacent integrated antenna unit in its row but also an adjacent integrated antenna unit in its column. Thus, in such an embodiment, integrated antenna unit 300 may couple its output phase offset through coupling array mesh 310 to neighboring integrated antenna units in either the row or column direction. In such a case, each transformer 1200 would require multiple secondary windings (discussed with respect to FIG. 14). Depending upon the desired coupling direction, the appropriate secondary winding would be selected.

Figure 13A:
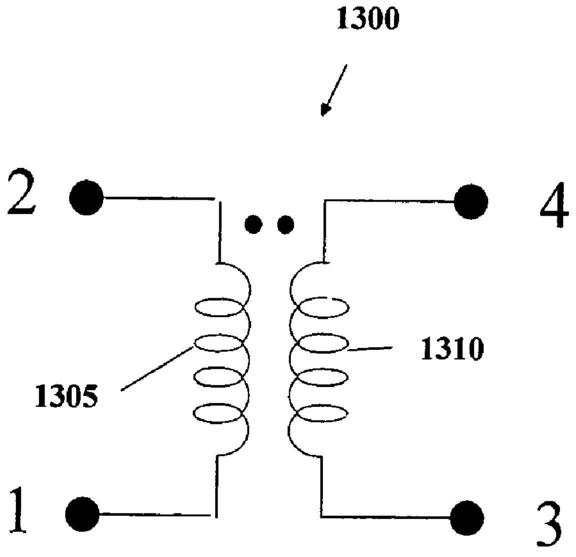
FIG. 13*a* is a schematic representation of a four-port transformer.
Figure 13B:
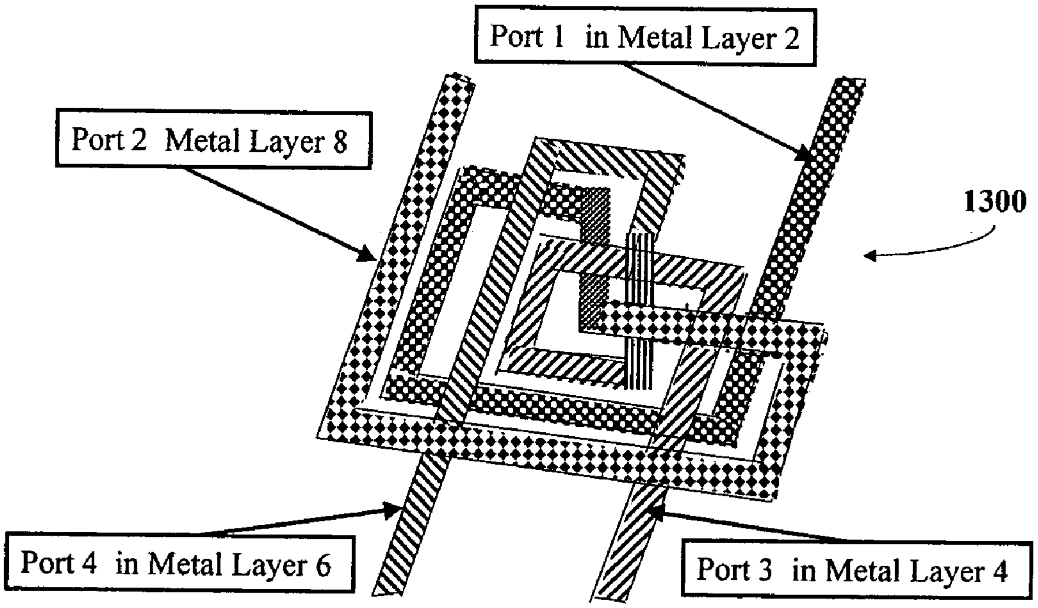
FIG. 13*b* is a perspective view, partially cutaway, of the four-port transformer of FIG. 13*b* implemented using a semiconductor process such as CMOS.

Note the advantages of implementing coupling array mesh 310 using transformers 1200. Unlike resistive coupling, transformers 1200 provide passive amplification for the coupled signals. Moreover, transformers 1200 may be implemented using conventional semiconductor processes such as CMOS. For example, as seen in FIGS. 13*a* and 13*b*, a 4-port transformer 1300 may be implemented using a conventional semiconductor process such as an 8 metal layer CMOS process discussed with respect to FIGS. 5 and 7. Primary winding 1305 is formed between ports 1 and 2. Port 1 is in metal layer 2 and port 2 is formed within metal layer 8. Secondary winding 1310 is formed between ports 4 and 3. Port 4 is in metal layer 6 and port 5 is in metal layer 4. Vias connect the metal layers as is known in the art.

Figure 14A:
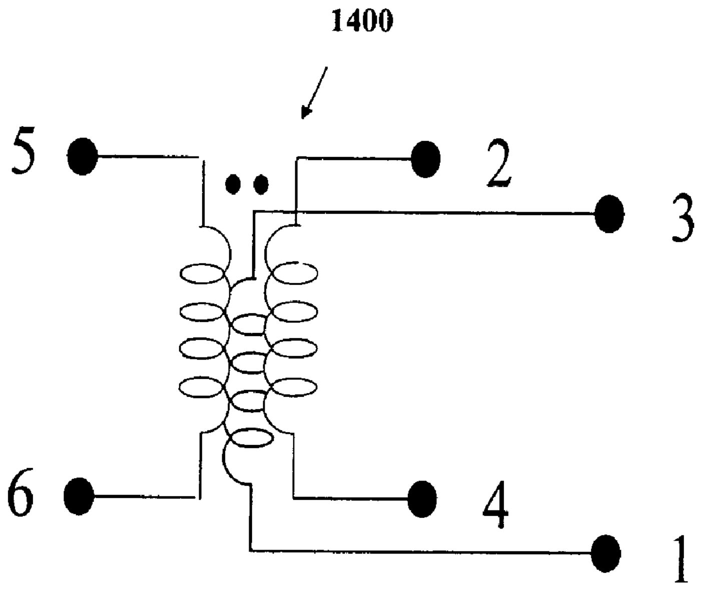
FIG. 14*a* is a schematic representation of a six-port transformer.
Figure 14B:
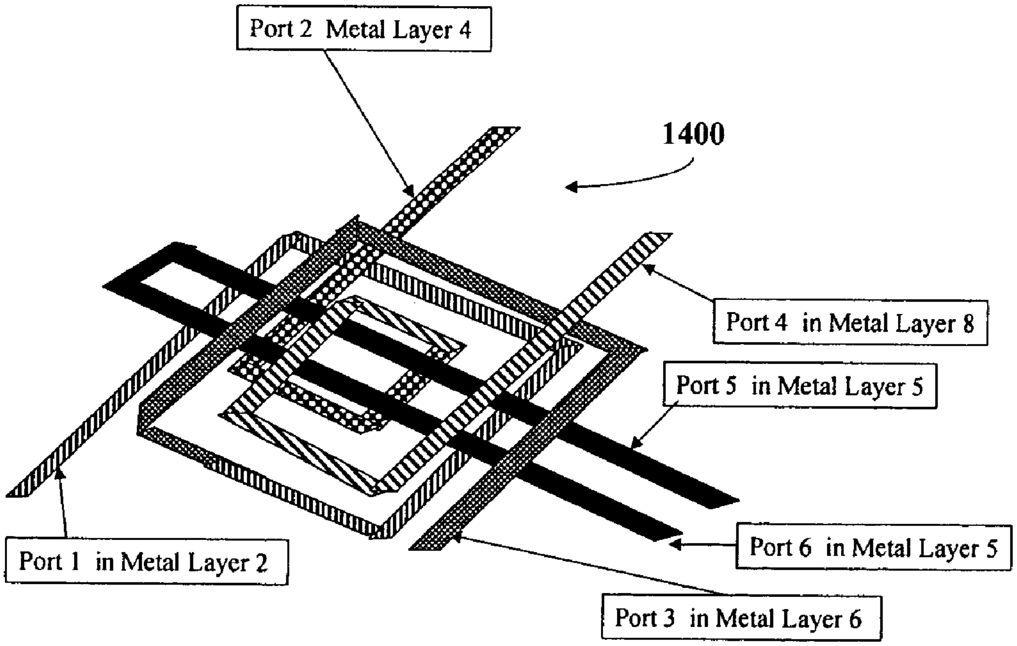
FIG. 14*b* is a perspective view, partially cutaway, of the six-port transformer of FIG. 14*b* implemented using a semiconductor process such as CMOS.
Figure 14C:
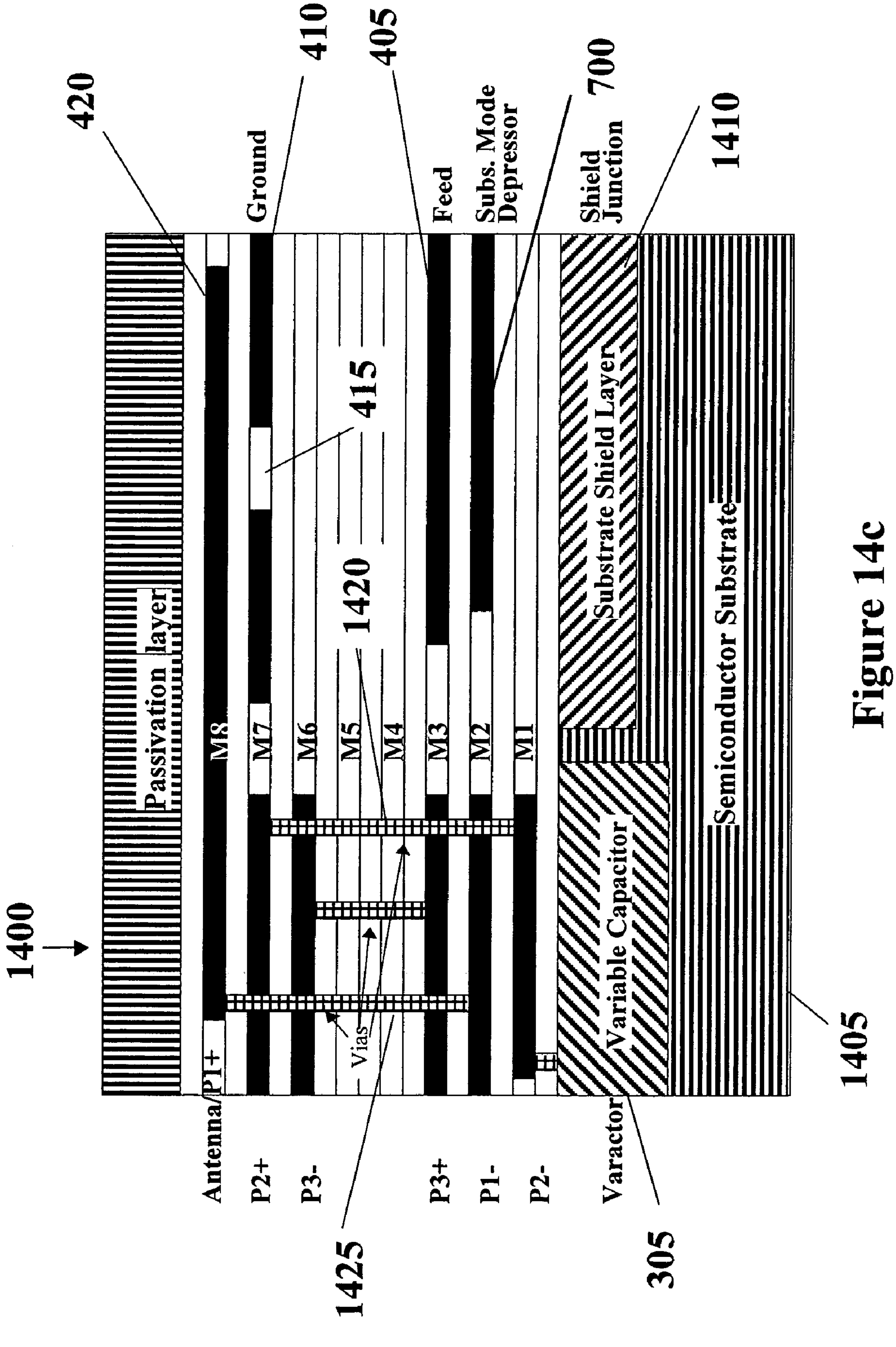
FIG. 14*c* is a cross-sectional view of a six-port transformer coupled to a patch antenna implemented using a semiconductor process such as CMOS.

A six-port transformer 1400, illustrated in FIGS. 14*a* and 14*b* may also be implemented in an 8 metal layer CMOS process such as that used with respect to FIGS. 5 and 7. A primary winding 1405 of transformer 1400 is formed between ports 5 and 6. Ports 5 and 6 both lie in metal layer 5. Secondary windings 1410 and 1415 are formed between ports 3 and 1 and ports 2 and 4, respectively. Port 3 is in metal layer 6 and port 1 is in metal layer 2. Port 2 is in metal layer 4 and port 4 is in metal layer 8. It will be appreciated that other semiconductor processes having differing numbers of metal layers may be used to form either transformer 1300 or 1400.

Figure 14D:
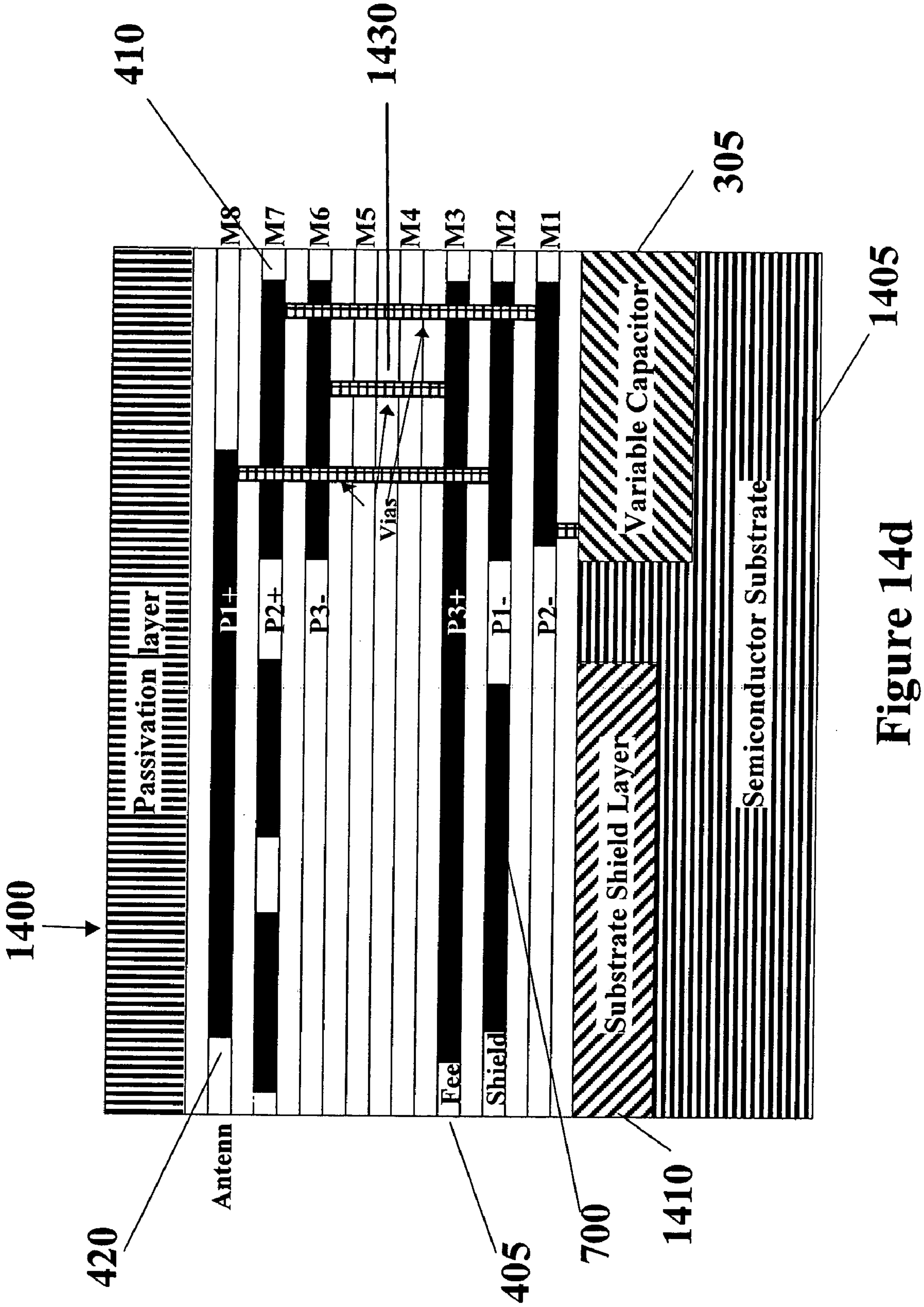
FIG. 14*d* is a cross-sectional view of a six-port transformer coupled to a patch antenna implemented using a semiconductor process such as CMOS.

Not only may inductive coupling be used for synthetic phasing of the integrated antenna units 300, it may also be used to inductively couple each antenna element 320 to its VCO 305 for both received and transmitted signals. Although the same winding may be used to couple the received and transmitted signals, using separate windings for the received and transmitted signals enables multiple frequency operation. For example, as seen in cross section in FIG. 14*c*, a transformer 1400 having separate windings for the transmitted and received signals may be coupled to a patch antenna element 400 configured as discussed with respect to FIG. 7. Although shown implemented using an 8-metal layer CMOS process, it will be appreciated that transformer 1400 may be implemented using any conventional semiconductor process having a sufficient number of metal layers. A VCO 305 is formed within a doped region on substrate 1405. VCO 305 couples to a secondary winding of transformer 1400 formed within metal layers M1 and M7 coupled by via 1420. In this fashion, VCO 305 may inductively couple to a primary winding formed within metal layers M8 and M2 coupled by via 1425. The primary winding couples to patch antenna element 420. Thus, VCO 305 may inductively receive RF signals from patch antenna element 420 through the secondary winding in metal layers M1 and M7. The winding ratio of the primary winding to that used in the secondary winding coupled to VCO 305 provides passive gain. Patch antenna element 420 formed in metal layer M8 couples to a linear feedline 405 (metal layer M3) through an aperture 415 in ground layer 410 (metal layer M7). A shield layer 700 may be formed within metal layer M2. In addition, a highly-doped shield region 1410 may be formed within substrate 1405. For a 95 GHz resonant frequency, the dimensions of patch antenna element 420, aperture 415, linear feedline 405, and shield layer 700 may the same as discussed with respect to FIG. 7. As illustrated in FIG. 14*d*, another secondary winding for transformer 1400 is formed in metal layers M3 and M6 as coupled through via 1430. This secondary winding couples to feedline 405 so that feedline 405 may be energized to excite transmissions by patch antenna element 420. In this fashion, transmitted signals and received signals for patch antenna element 420 couple through different secondary windings of transformer 1400. Those of ordinary skill in the art will appreciate that by adjusting the dimensions of the coils for these secondary windings, the transmit and receive signal frequencies may be different, thereby providing frequency diversity using a single antenna.

Transformers may also be used in the present invention to couple each VCO 305 to its corresponding antenna element 305 in either a single-ended or double-ended fashion. Should antenna element 305 comprise a monopole antenna, thereby requiring only a single-ended feed, a 4-port transformer having a single secondary winding may be used. Of course, as discussed with respect to FIGS. 14*c* and 14*d*, a monopole patch antenna may also couple through a 6-port transformer to isolate the transmitted and received signals. Should antenna element 305 comprise a dipole antenna, thereby requiring a differential feed, a 6-port transformer having two secondary windings may be used. Alternatively, a dipole antenna may receive a differential feed using only a 4-port transformer as will be discussed with respect to FIGS. 15*a* and 15*b*.

Figure 15A:
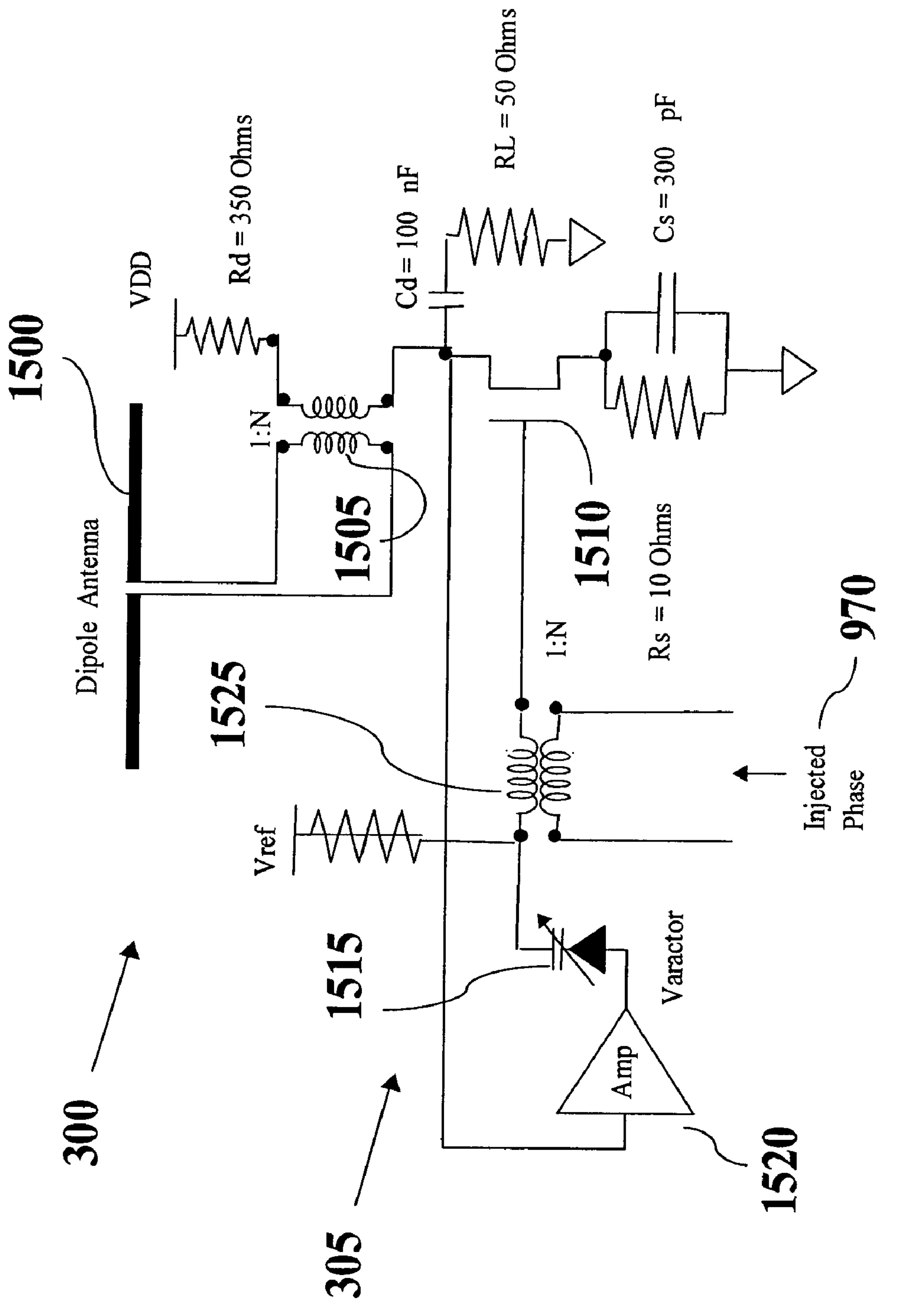
FIG. 15*a* is a schematic diagram for an inductively-coupled integrated antenna unit according to one embodiment of the invention.

FIG. 15*a* illustrates an embodiment of integrated antenna unit 300 including a dipole antenna element 1500 inductively coupled through a transformer 1505 to a voltage-controlled oscillator 305 comprising a field effect transistor 1510 using a varactor 1515 for tuning. Dipole antenna element 1500 couples across the primary winding of transformer 1505 whereas the secondary winding of transformer 1505 couples to the drain terminal of field effect transistor 1510. Varactor 1515 is coupled within a low-pass feedback loop including amplifier 1520 and a coupling array mesh transformer 1525. By injecting an input phase offset 970 into transformer 1525, integrated antenna unit 300 may be mode-locked as described above. To provide a wide locking range, the Q-factor of VCO 305 should be kept relatively low. However as the Q-factor is lowered, phase noise is increased. Thus, a design trade-off between phase noise and locking range should be reached, depending upon design specifications. By adjusting the bandwidth and loop gain of the low-pass filter incorporating varactor 1515, the locking range may be readily controlled. Simulation results indicate that the integrated antenna unit 300 of FIG. 15 may achieve a tuning sensitivity of 0.1 GHz/V at an operating frequency of 10 GHz while providing a −100 dBC/Hz phase noise at 100 KHz.

Figure 15B:
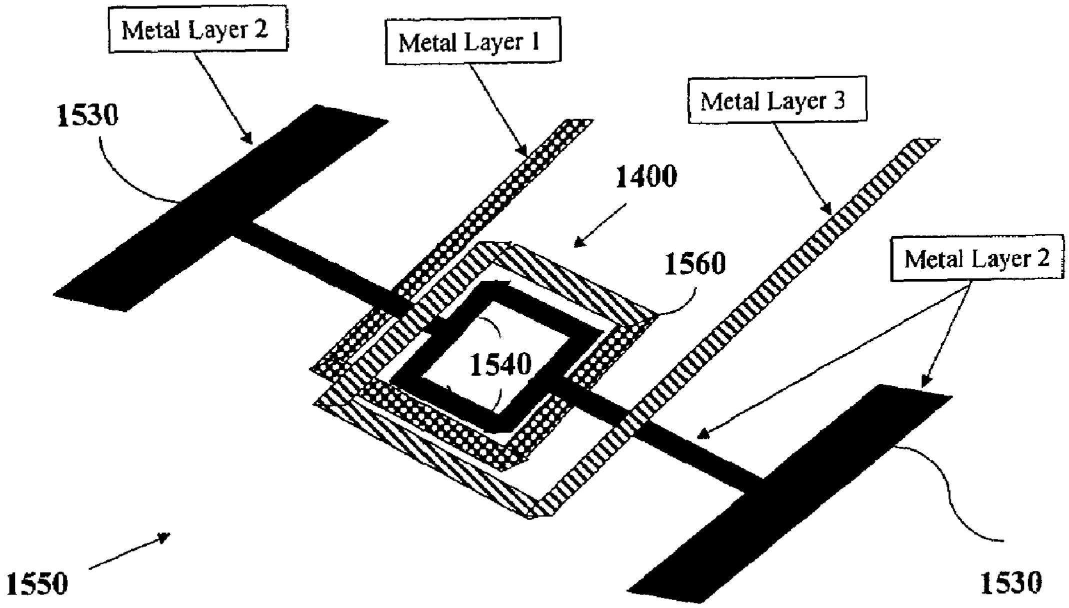
FIG. 15*b* is a perspective view, partially cut-away, of an inductively-coupled T-shaped dipole antenna implemented using a semiconductor process such as CMOS.
Figure 15C:
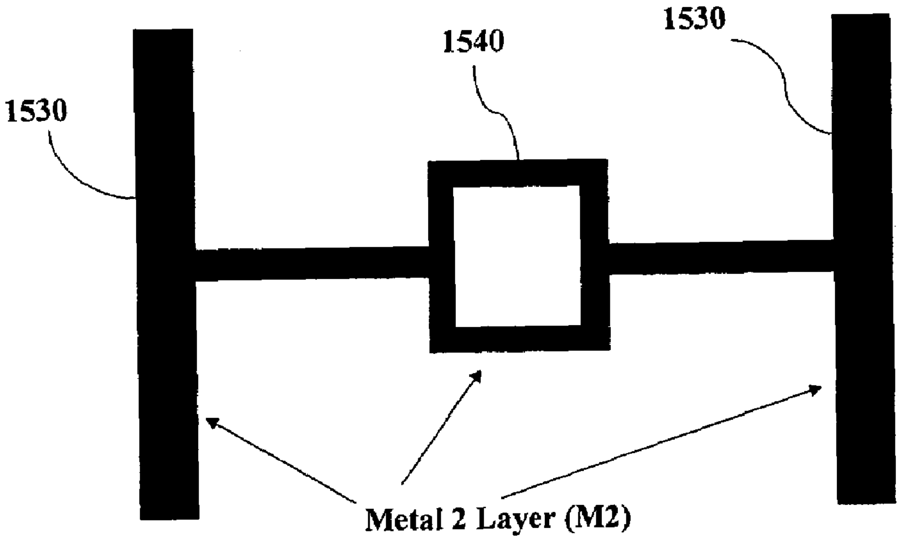
FIG. 15*c* is a perspective view of the T-shaped dipole antenna of FIG. 15*b*.

As seen in FIG. 15*b*, a T-shaped dipole antenna 1550 may be implemented using a semiconductor process in a single metal layer M2. Each T-shaped antenna element 1530 couples to a secondary coil 1540 of transformer 1400 formed on the same layer of metal. The relationship of secondary coil 1540 to T-shaped antenna elements 1530 may also be seen in FIG. 15*c*, wherein only metal layer M2 is illustrated. Primary coil 1550 of transformer 1400 is formed in metal layers M3 and M1 as coupled through via 1560. Consider the advantages of inductively coupling to a dipole antenna as discussed with respect to FIGS. 15*a* through 15*c* as compared to the via feed structure discussed with respect to FIG. 8*b*. Exciting each T-shaped antenna element through vias induces undesired radiation from the vias. Because secondary coil 1540 and T-shaped antenna elements 1530 may all be formed on the same metal layer, no such undesirable radiation is induced.

Coupling Array Mesh Waveguide Implementation

Figure 16:
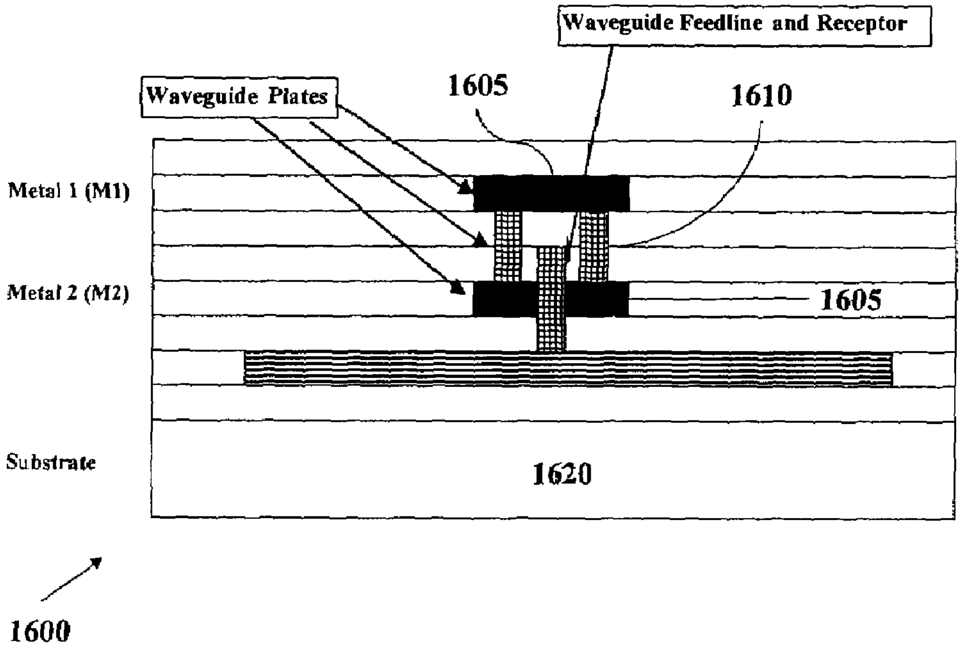
FIG. 16 is a cross-sectional view of a waveguide implementation of a coupled array mesh according to one embodiment of the invention.
Figure 17:
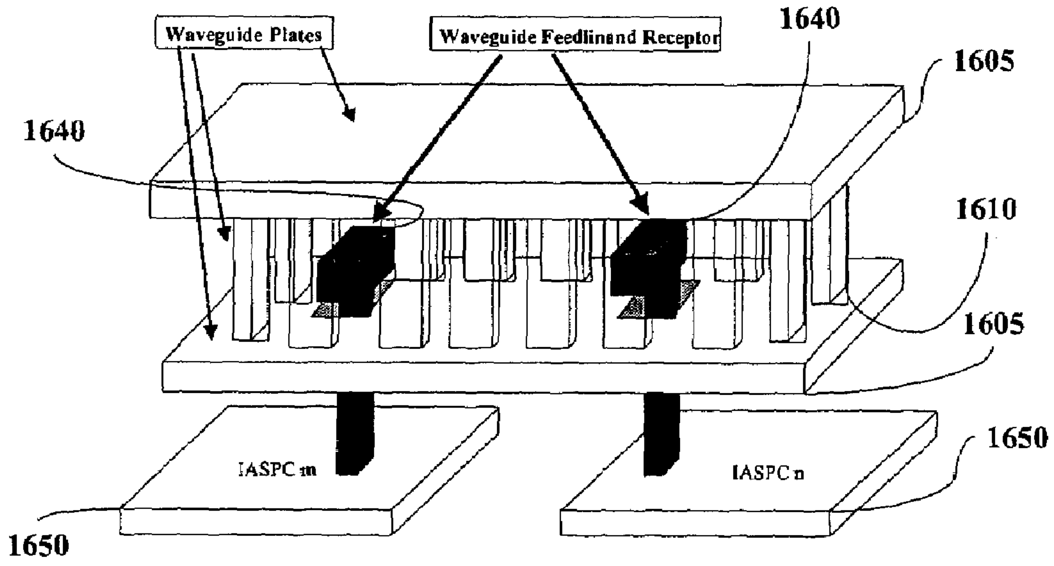
FIG. 17 is a perspective view, partially cutaway, of the waveguide of FIG. 16, implemented using a semiconductor process such as CMOS.

As discussed above, one function for the coupling array mesh is to distribute a reference clock to the integrated antenna units. For transmission of a high speed clock, a waveguide 1600 as seen in cross section in FIG. 16 may be used. Advantageously, waveguide 1600 may be constructed using conventional semiconductor processes such as CMOS. Waveguide 1600 comprises two metal plates 1605 within metal layers M1 and M2 formed on a substrate 1620. Metal plates 1605 may be formed using conventional photolithographic techniques. To construct the sidewalls of waveguide 1600, a plurality of vias 1610 couple between metal plates 1605. FIG. 17 is a perspective view of waveguide 1600 with the semiconductor insulating layers cutaway. Vias 1610 may be separated by distances of up to one-half to a full wavelength of the operating frequency. A feedline may be used to excite transmissions within waveguide 1600 that are received by receptors. Because the construction of such feedlines and receptors is symmetric, they will be generically referred to herein as “feedline/receptors” 1640. Thus, feedline/receptors 1640, which may be formed as T-shaped monopoles, excite transmissions within waveguide 1600 or may act to receive transmissions. Each feedline/receptor couples to control circuitry 1650 formed within substrate 1620. Signals may travel unidirectionally from one feedline/receptor 1640 to another feedline/receptor 1640 or bidirectionally between feedline/receptors 1640 in a half or full duplex fashion.

Consider the advantages of using waveguide 1600 as a clock tree to provide a synchronized source for signal shaping, signal processing, delivery, and other purposes. A transmitter (not illustrated) within control circuitry 1650 may generate a global clock at ten to one hundred times the required system clock and broadcast it through waveguide 1600 using one of the feedline/receptors 1640. A clock receiver within the control circuitry coupled to a receiving feedline/receptor 1640 may detect the global clock and divides it down to generate the local system clock. After proper buffering, the local system clock is synchronized to the source of the global clock. Advantageously, this synchronization addresses the jitter and de-skew problems without the complexity and cost faced by conventional high-speed (10 GHz or greater) clock distribution schemes. Because waveguide 1600 may be implemented using conventional semiconductor processing, waveguide 1600 may be implemented using low-cost mass production techniques.

Figure 18A:
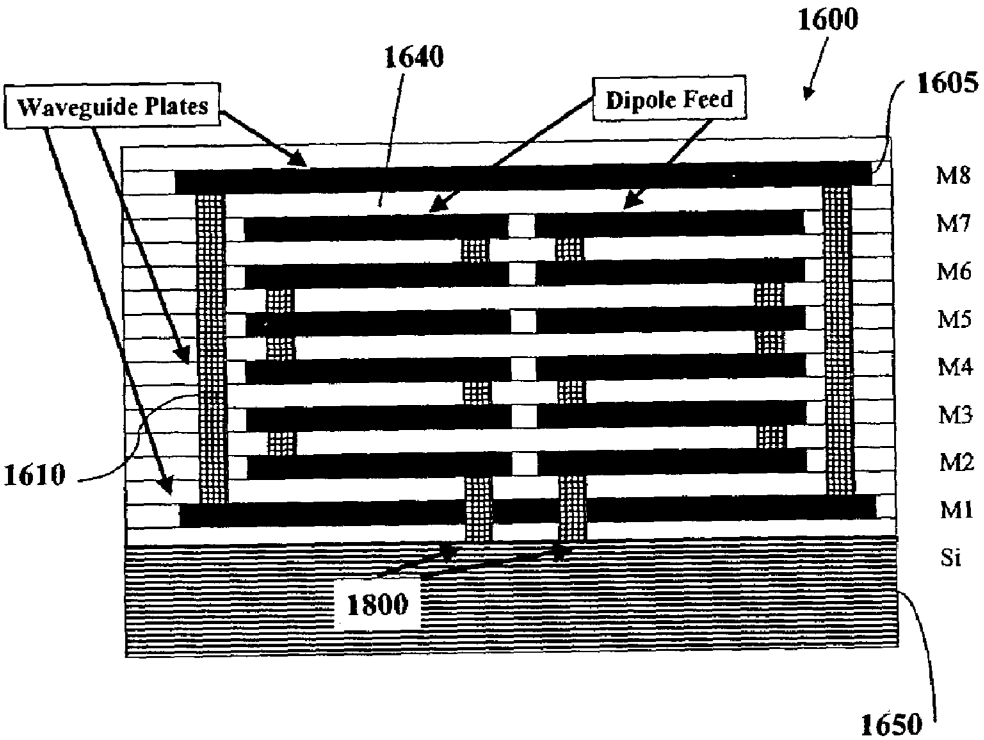
FIG. 18*a* is a cross-sectional view of a waveguide having a mural-type dipole feed according to one embodiment of the invention.
Figure 18B:
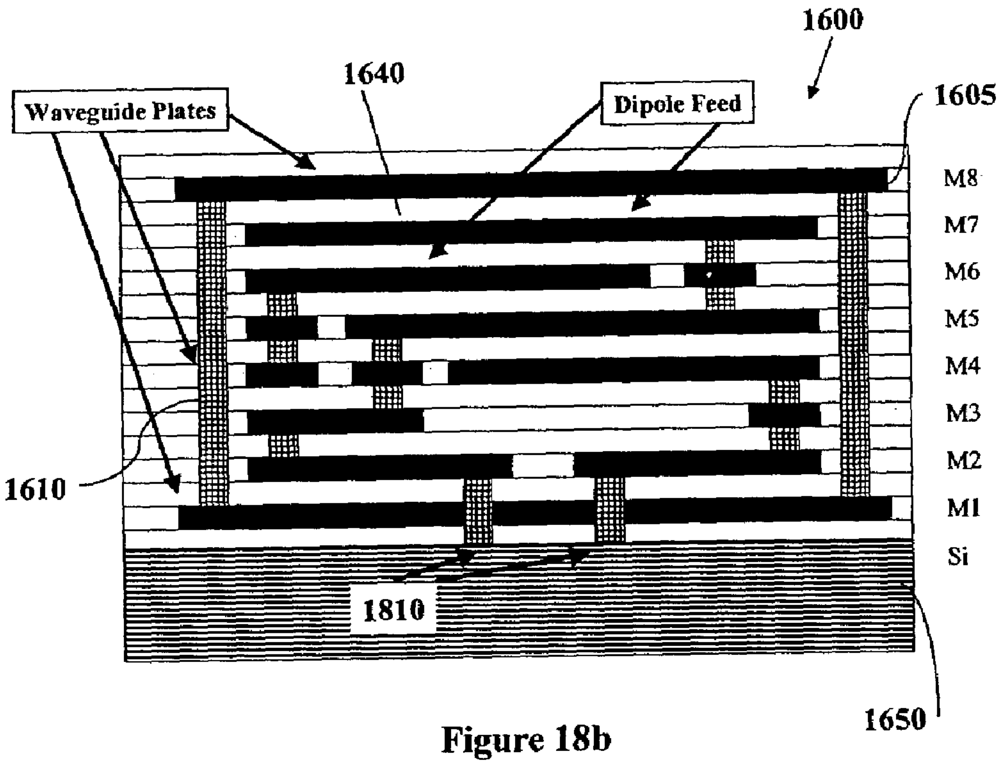
FIG. 18*b* is a cross-sectional view of a waveguide having an interleaved mural-type dipole feed according to one embodiment of the invention.
Figure 18C:
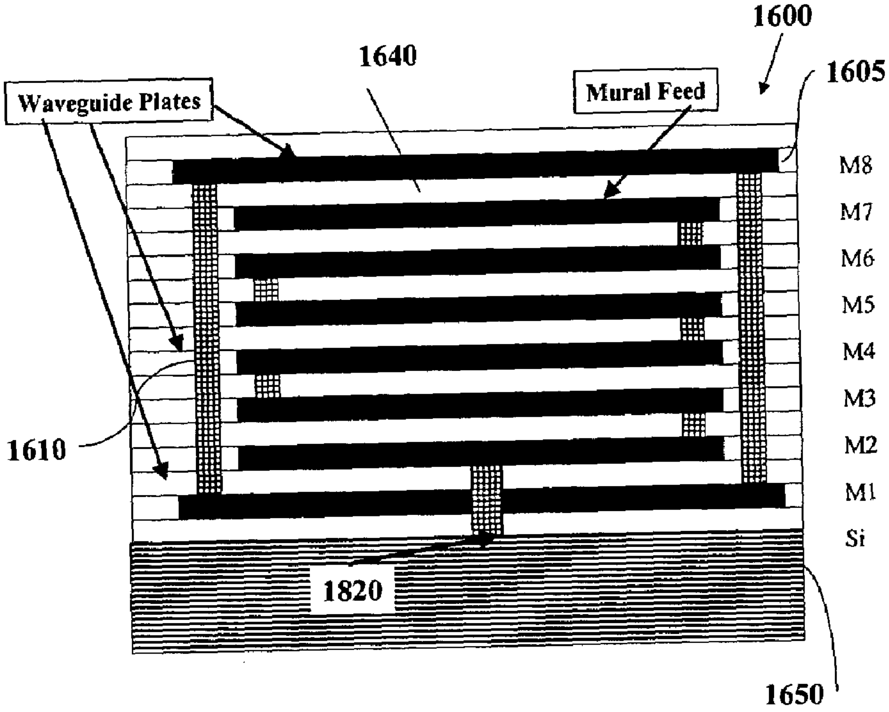
FIG. 18*c* is a cross-sectional view of a waveguide having a mural-type monopole feed according to one embodiment of the invention.
Figure 18D:
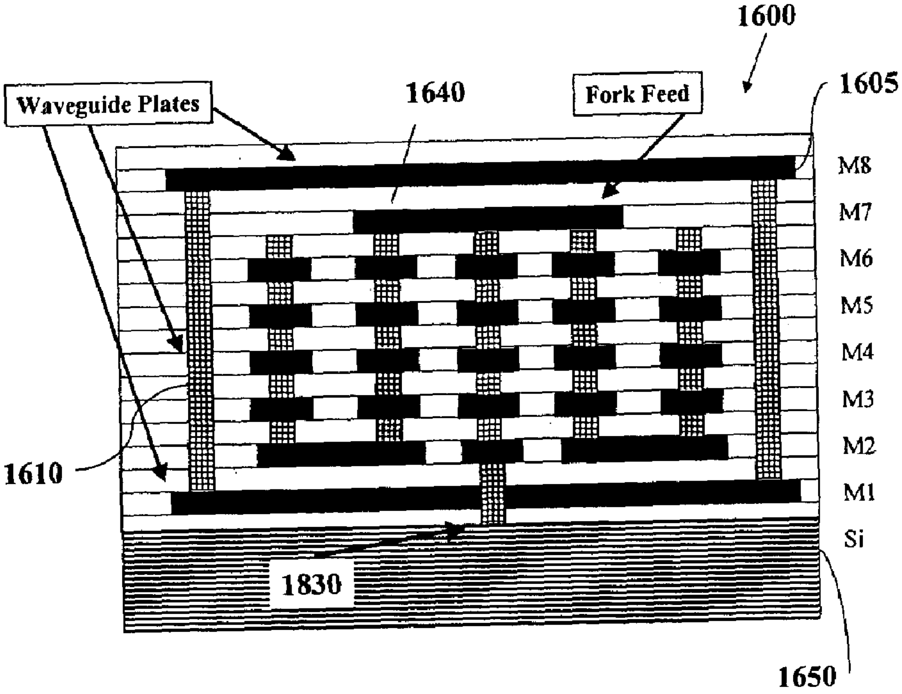
FIG. 18*d* is a cross-sectional view of a waveguide having a mural-type fork feed according to one embodiment of the invention.

Numerous topologies are suitable for feedline/receptors 1640 depending upon application requirements. For example, FIG. 18*a* illustrates a cross-section of waveguide 1600 formed using an 8-metal layer semiconductor process such as CMOS. Waveguide plates 1605 are formed in metal layers M1 and M8. Feedline/receptor 1640 comprises a mural-type dipole 1800 of plates formed in metal layers M2 through M7 to generate a traveling wave such as a TM21 mode with minimal additional mode generation that incorporates a quarter wavelength length in a relatively compact area. Although shown directly coupled to control circuitry 1620, dipole 1800 has a relatively low coupling capacitance and is thus suitable for inductive coupling and matching applications. In an alternate embodiment, an interleaved mural-type dipole 1810 as seen in cross section in FIG. 18*b* may be used to transmit through waveguide 1600. Dipole 1810 may also generate a TM21 propagation mode with minimal additional mode generation. In another embodiment, a mural-type monopole 1820 as seen in cross-section in FIG. 18*c* may be used to transmit through waveguide 1600. Monopole 1820 may generate a TM11 propagation mode. Alternatively, a fork-type monopole feed 1830 as seen in cross section in FIG. 18*d* may be used to generate a TM11 propagation mode. Advantageously, the use of fork-type monopole feed 1830 avoids patterning and manufacturing of long lines of metal raise issues with metal patterning definition (photolithographic process) or etching (removing undesired portions of the metal).

Figure 18E:
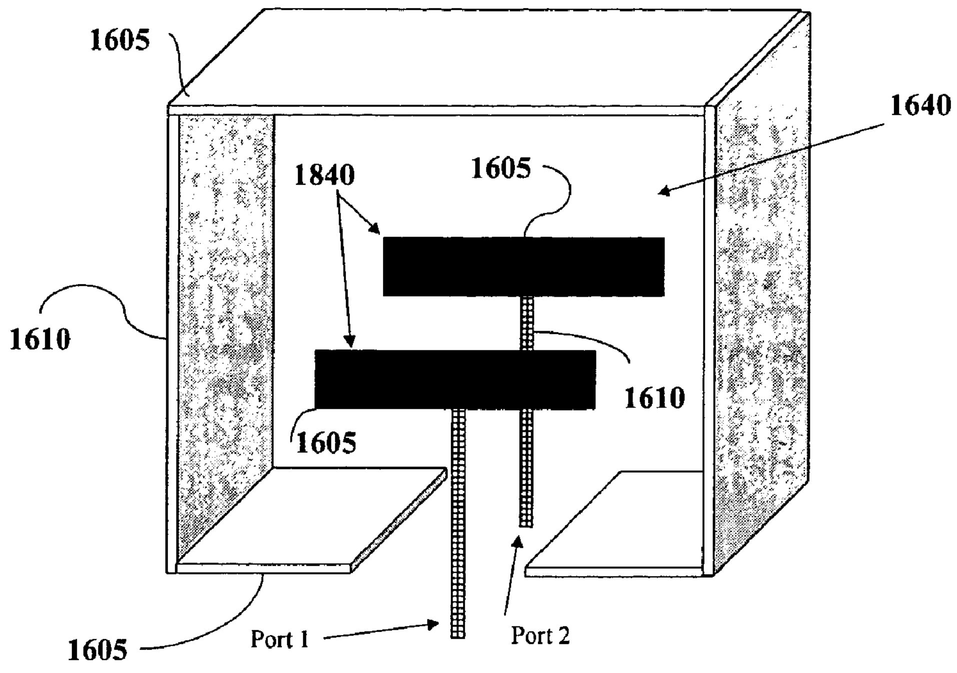
FIG. 18*e* is a perspective view, partially cutaway of a T-shaped dipole feed for a waveguide according to one embodiment of the invention.
Figure 18F:
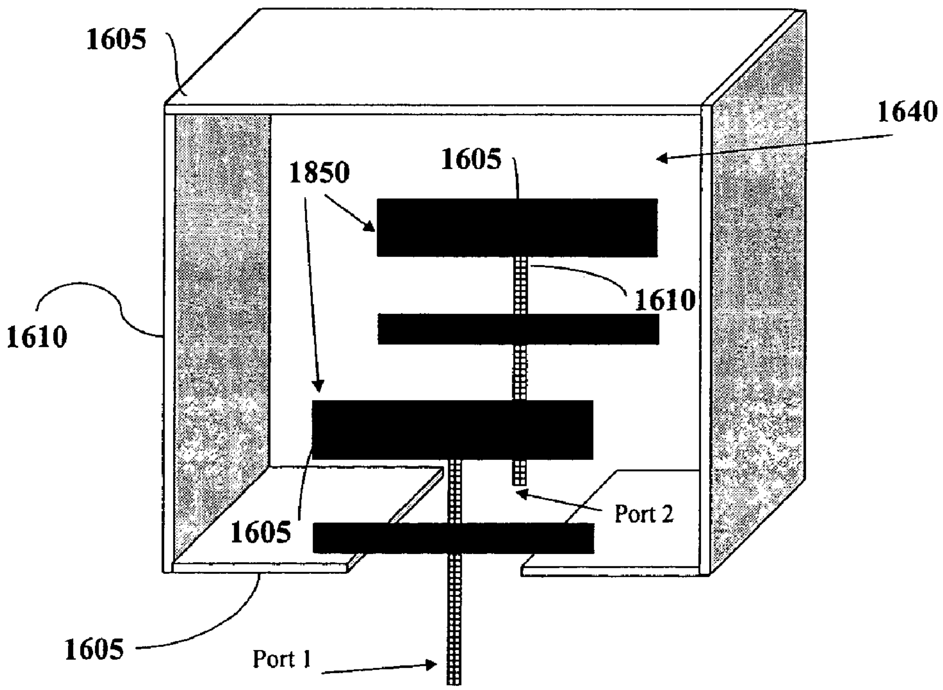
FIG. 18*f* is a perspective view, partially cutaway of a dual-arm-T-shaped dipole feed for a waveguide according to one embodiment of the invention.

A T-shaped dipole design for feedline/receptor 1640 has the advantage of simplicity and mode minimization. As seen in perspective view in FIG. 18*e*, a T-shaped dipole 1840 may be formed in adjacent metal layers of a semiconductor process. Simulation results indicate that at an operating frequency of 80 GHz, T-shaped dipole 1840 may achieve a return loss (S11) of −32 dB. By adding an additional "T" arm to form double-arm T-shaped dipole 1850 as seen in FIG. 18*f*, the return loss may be reduced to −43 dB.

Regardless of the topology implemented for feedline/receptor 1640 in waveguide 1600, its dimensions are limited by the furthest separation achievable between the metal layers used to form waveguide plates 1605. For example, if the first and eighth metal layers are used to form waveguide plates 1605 in a conventional 8-metal-layer semiconductor process such as CMOS, this separation is approximately seven micrometers. Because the higher frequency clock rates correspond to smaller wavelengths, such a separation is adequate for 40 GHz and higher clock rates which would correspond to a feedline/receptor 1640 length of a few hundred microns to a few millimeters.

Figure 19:
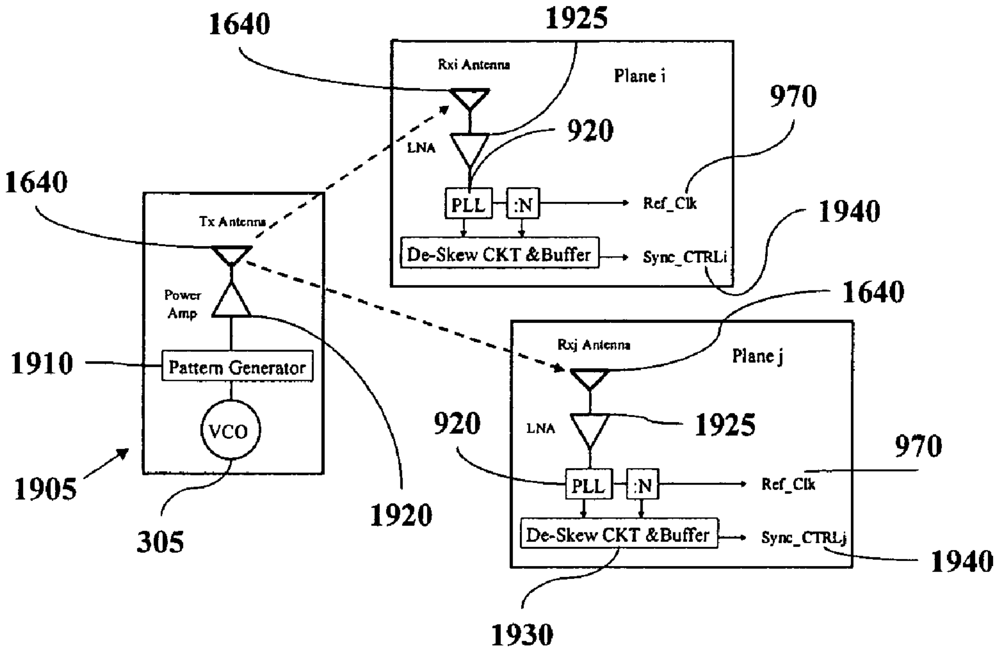
FIG. 19 is a block diagram of a global clock synchronization system using a waveguide according to one embodiment of the invention.

Various methods of coding may be used to ensure synchronization to a global clock transmission through waveguide 1600. A conceptual diagram of a such a global clock transmission is illustrated in FIG. 19 in which a master VCO 1905 couples its output to a pattern generator 1910. For example, if each VCO 305 forms part of phase-locked loop (PLL) 920 (FIG. 9), the coding must ensure sufficient signal transitions to sustain the edges necessary for PLL 920 to achieve lock. As is known in the art, data and clock may be encoded together such that a "global clock" transmission may represent both a global clock and data. Accordingly, it will be appreciated by those of ordinary skill in that art that "global clock" may represent both a clock source and a data source. After coding by pattern generator 1910 and amplification by a power amplifier 1920, the resulting global clock signal is transmitted through waveguide 1600 (not illustrated for clarity) by slave feedline/receptors 1640. Each slave feedline/receptor 1640 couples to a low-noise amplifier 1925. In turn, each low-noise amplifier 1925 couples to a PLL 920. After de-skewing from a de-skew module 1930 in response to the coding provided by pattern generator 1910, divided-down reference clocks 970 and synchronization signals 1940 are available for local use.

The skew associated with propagation is determined by the actual voltage wave v(x) that propagates through waveguide 1600 as a function of the propagation distance x. The voltage wave v(x) may be expressed as:

$$V(x)=v\cdot e^{-\alpha.x+j.\beta.x}$$

where v is the propagation velocity, α is the resistive loss (which is typically negligible in waveguide 1600), and β is 2π/λ. The propagation velocity v is given by:

$$v=\frac{1}{\sqrt{L_u\cdot C_u}}$$

where $L_u$ is the inductance per unit length and $C_u$ is the capacitance per unit length.

Figure 20A:
FIG. 20*a* is a graphical representation of a code sequence for de-skewing of global clock transmission through a waveguide according to one embodiment of the invention.

To address this skew, pattern generator 1910 may generate a sequence of "K," "R," and "A" codes as illustrated in FIG. 20*a*. In this code sequence, the "A" code is transmitted after a "KRRKKR" code sequence has been transmitted. In this fashion, depending upon the transmission frequency and the propagation distance between a transmitting feedline/receptor 1640 and a receiving feedline/receptor 1640 (FIG. 16), a receiving unit may, after receiving an initial "A" code, make an assumption about the number of transmission cycles that may have expired. An example of suitable A, R, and K codes is:

A=28.3=001111 0011, K=28.5=001111 1010, and R=28.0=001111 0100.

Given such a set of "K28.5" codes, a suitable error code "E" is: E=30.7=011110 1000

Figure 20B:
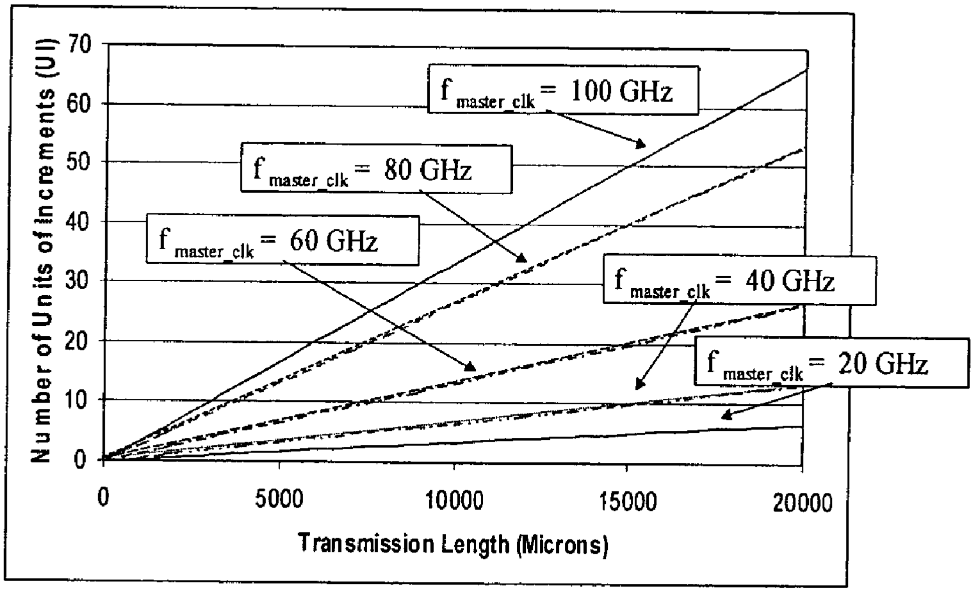
FIG. 20*b* is a graphical representation of the number of cycles generated as a function of propagation distance (in microns) and transmission frequency.

FIG. 20*b* is a graphical representation of the number of cycles generated as a function of propagation distance (in microns) and transmission frequency. Analysis of FIG. 20*b* indicates that an 80 GHz transmission will complete less than 60 cycles while propagating a distance of 20,000 microns (20 mm). Accordingly, if the "AKRRKKRA" sequence is transmitted (using 80 cycles over a propagation distance of 20 mm or less) at a frequency of 80 GHz, the local clocking system may initiate a synchronization acknowledgement upon receipt of the second "A" code. Dividing down the received signal by 32, a PLL 920 may then generate a reference clock 970 having a frequency of 2.5 GHz. Should the propagation distance be greater than 20 mm, the length of the repeating code sequence may be increased—for example, to 72 cycles, 96 cycles, or greater depending upon individual requirements. The transition of the "K," "R." and "A" codes guarantees the locking of the receiving PLLs 920. The seven bit comma string preceding each symbol in the previously-mentioned K28.5 code may be defined as b'0011111' (comma+) or b'1100000' (comma−). An associated protocol assures that "comma+" is transmitted with either equivalent or greater frequency than "comma−" for the duration of the transmission to ensure compatibility with common components. The comma contained within the /K28.5/special code group is a singular bit pattern which cannot appear in other locations of a code group and cannot be generated across the boundaries of two adjacent code groups in the absence of transmission errors.

Figure 20C:
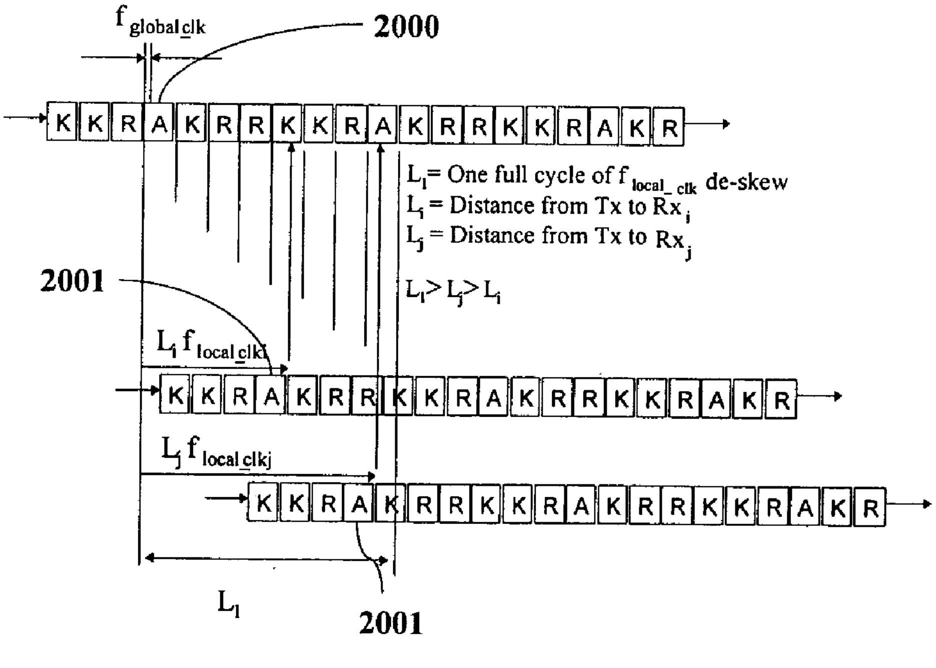
FIG. 20*c* is a graphical representation of the propagation delay for the code sequence of FIG. 20*a* with respect to two different propagation paths.

A graphical representation of the propagation delay between a pattern generator 1910 generating the K28.5 code and two receiving PLLs 920 (FIG. 20*a*) is illustrated in FIG. 20*c*. After transmission of an initial "A" code 2000, different amounts of propagation delay is encountered at the receiving PLLS 920, each receiving a delayed "A" code 2001, respectively. With the proper amount of buffering achieved, for example, through the use of stack or barrel shifters, the de-skew between local clocks occurs.

Figure 20D:
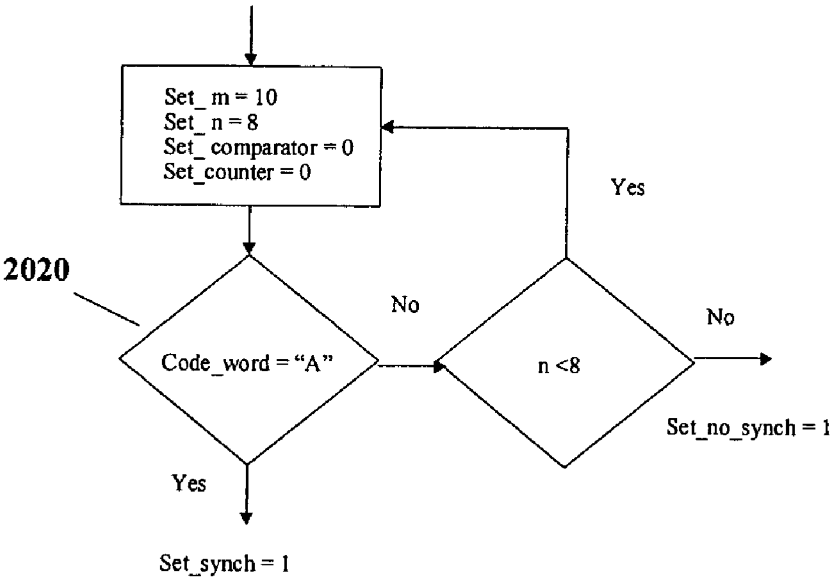
FIG. 20*d* is a flowchart illustrating the management of timestamp generation from received codewords.

A simple state machine for each de-skew module 1930 (FIG. 19) performing the steps illustrated in FIG. 20*d* may manage the timestamp generation from the received codewords propagated through waveguide 1600 according to a global clock (blind transmit). At step 2020, if the codeword "A" is detected, a synchronization acknowledgment "Set_synch" word may be asserted true to indicate the identification of the code at this location.

Figure 21:
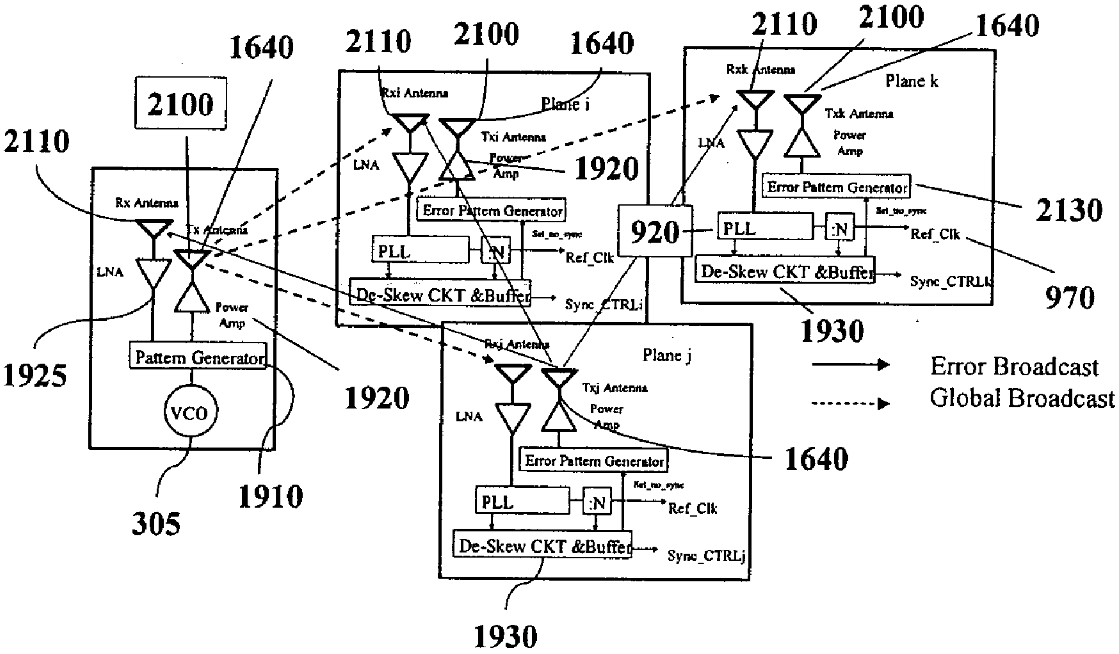
FIG. 21 is a block diagram of a global clock synchronization system using a waveguide according to one embodiment of the invention.

It will be appreciated that many different techniques may be used to synchronize local clocks to a transmitted global clock using a waveguide 1600. For example, FIG. 21 represents an enhancement to the global blind clock synchronization technique discussed with respect to FIGS. 19 through 20*c*. In the embodiment of FIG. 21, each feedline/receptor 1640 may be used to both transmit and receive signals. For illustration clarity, each feedline/receptor 1640 is shown as comprising a feedline/transmitting antenna 2100 and a receptor/receiving antenna 2110. In practice, however, these antennas may be combined or kept separate.

Master VCO 305 may initiate an "AKRRKKRA" sequence as described previously. Each receiving PLL 920 not only associates with a de-skew module 1930 as described previously but also associates with an error pattern generator 2130. Should a PLL 920 encounter a missing "A" code or simply cannot detect any "A" codes as determined by error pattern generator 2130, a sequence of "E" codes (described previously) may be broadcast from the associated feedline/transmitting antenna 2100. In response, receiving PLLs 920 will reset their clocks 970 to local without locking to the global clock signal. These receiving PLLs remain in reset as long as they receive the E code from any source. The master VCO 305, in response to receipt of the E code, stops sending any signal for a complete cycle (in this example, the AKRRKKRA sequence). Upon resumption of the global clock transmission and lack of any "E" code reception, the normal synchronization process continues.

Integrated Device

As discussed above, conventional semiconductor processes may be used to form antenna elements 320 and coupling array mesh 310. The same substrate may be used for both devices. Similarly all remaining components such as those discussed with respect to FIG. 9 may be integrated onto the same substrate to form an integrated antenna and signal processing circuit. In addition, an integrated antenna and signal processing circuit may be implemented on a flexible substrate using thin-film processing techniques. The organic materials used for flexible substrates may be processed at relatively low temperatures using spin coating, stamping or other thin-film processing techniques.

The above-described embodiments of the present invention are merely meant to be illustrative and not limiting. It will thus be obvious to those skilled in the art that various changes and modifications may be made without departing from this invention in its broader aspects. The appended claims encompass all such changes and modifications as fall within the true spirit and scope of this invention.

I claim:

1. A remote sensor, comprising:

a plurality of integrated antenna units, wherein each integrated antenna unit includes an oscillator coupled to an antenna;

a network providing phasing information to each oscillator so as to phase lock at least a subset of the oscillators; and a controller to control the phasing information and to modulate a transmission by the subset of the oscillators according to a binary code, wherein the integrated antenna units, the network, and the controller are all integrated on a semiconductor substrate.

2. The remote sensor of claim 1, further comprising an infra-red sensor integrated on the semiconductor substrate and coupled to the controller, wherein the controller modulates the transmission by subset of integrated antenna units in response to infra-red signals received by the infra-red sensor.

3. The remote sensor of claim 1, further comprising a kinetic sensor integrated on the semiconductor substrate and coupled to the controller, wherein the controller is configured to modulate the transmission by the antenna in response to the kinetic energy received by the kinetic sensor.

4. The remote sensor of claim 1, further comprising:

a chemical sensor integrated on the semiconductor substrate and coupled to the controller, wherein the controller modulates the transmission by subset of integrated antenna units in response to chemicals detected by the chemical sensor.

5. The remote sensor of claim 1, wherein the binary code is at least 1024 bits in length.

6. The remote sensor of claim 1, wherein the controller stores a plurality of binary codes and to modulate the transmission by the subset of integrated antenna units according to a binary code selected from the stored plurality of binary codes.

7. The remote sensor of claim 6, wherein the controller selects the binary code according to the frequency of the RF signal received at the subset of integrated antenna units.

8. The remote sensor of claim 1, wherein each antenna is a patch antenna.

9. The remote sensor of claim 1, wherein each antenna is a T-shaped dipole antenna.

10. The remote sensor of claim 9, wherein each T-shaped dipole antenna is inductively coupled to its oscillator.

* * * * *